US008818919B2

(12) United States Patent
Natarajan et al.

(10) Patent No.: US 8,818,919 B2
(45) Date of Patent: Aug. 26, 2014

(54) MULTIPLE IMPUTATION OF MISSING DATA IN MULTI-DIMENSIONAL RETAIL SALES DATA SETS VIA TENSOR FACTORIZATION

(75) Inventors: Ramesh Natarajan, Pleasantville, NY (US); Arindam Banerjee, Roseville, MN (US); Hanhuai Shan, St. Paul, MN (US)

(73) Assignees: International Business Machines Corporation, Armonk, NY (US); Regents of the University of Minnesota, Minneapolis, MN (US)

( * ) Notice: Subject to any disclaimer, the term of this patent is extended or adjusted under 35 U.S.C. 154(b) by 406 days.

(21) Appl. No.: 13/204,237

(22) Filed: Aug. 5, 2011

(65) Prior Publication Data

US 2013/0036082 A1 Feb. 7, 2013

(51) Int. Cl.
*G06F 15/18* (2006.01)
*G06Q 30/00* (2012.01)

(52) U.S. Cl.
CPC .................................... *G06Q 30/00* (2013.01)
USPC .......................................................... 706/12

(58) Field of Classification Search
USPC .......................................................... 706/12
See application file for complete search history.

(56) References Cited

PUBLICATIONS

Schafer, J. L., & Olsen, M. K., "Multiple imputation for multivariate missing-data problems: A data analyst's perspective", Multivariate behavioral research, The Pennsylvania State University, Mar. 9, 1998, pp. 1-42.*

Mayfield, C. et al., "A Statistical Method for Integrated Data Cleaning and Imputation", Perdue University—Computer Science Technical Reports, 09-008, 2009, pp. 1-14.*

Acock, A., "Working With Missing Values", J. Marriage and Family, vol. 67, Nov. 2005, pp. 1012-1028.*

Salakhutdinov et al., "Restricted Boltzmann Machines for Collaborative Filtering", Proceedings of the 24th International Conference on Machine Learning, Corvalis, OR, 2007.

Salakhutdinov et al., "Bayesian Probabilistic Matrix Factorization using Markov Chain Monte Carlo", Proceedings of the 25th International Conference on Machine Learning, Helsinki, Finland, 2008.

(Continued)

*Primary Examiner* — Kakali Chaki
*Assistant Examiner* — Vincent Gonzales
(74) *Attorney, Agent, or Firm* — Scully, Scott, Murphy & Presser, P.C.; Daniel P. Morris, Esq.

(57) ABSTRACT

A system, method and computer program product provides for multiple imputation of missing data elements in retail data sets used for modeling and decision-support applications based on the multi-dimensional, tensor structure of the data sets, and a fast, scalable scheme is implemented that is suitable for large data sets. The method generates multiple imputations comprising a set of complete data sets each containing one of a plurality of imputed realizations for the missing data values in the original data set, so that the variability in the magnitudes of these missing data values can be captured for subsequent statistical analysis. The method is based on the multi-dimensional structure of the retail data sets incorporating tensor factorization, that in a preferred embodiment can be implemented using fast, scalable imputation methods suitable for large data sets, to obtain multiple complete data sets in which the original missing values are replaced by various imputed values.

22 Claims, 15 Drawing Sheets

(56) References Cited

PUBLICATIONS

Buchanan et al., "Damped Newton Algorithms for Matrix Factorization with Missing Data", Department of Engineering Science, Oxford University, UK, Proceeding CVPR '05 Proceedings of the 2005 IEEE Computer Society Conference on Computer Vision and Pattern Recognition (CVPR'05)—vol. 2-vol. 02, 2005.
Kolda et al., "Tensor Decompositions and Applications", SIAM Review, Jun. 10, 2008, pp. 1-47.
Chi et al., "Probabilistic Polyadic Factorization and Its Application to Personalized Recommendation", CIKM'08, Oct. 26-30, 2008, Napa Valley, California, USA, pp. 941-950.
Chu et al., "Probabilistic Models for Incomplete Multi-dimensional Arrays", Proceedings of the 12th International Conference on Artificial Intelligence and Statistics (AISTATS) 2009, Clearwater Beach, Florida, USA, vol. 5 of JMLR: W&CP 5, 2009, pp. 89-96.
Xiong et al., "Temporal Collaborative Filtering with Bayesian Probabilistic Tensor Factorization", Machine Learning Department, Carnegie Mellon University; Robotics Institute, Carnegie Mellon University; Language Technology Institute, Carnegie Mellon University, 2010.
Su et al., "Multiple Imputation with Diagnostics (mi) in R: Opening Windows into the Black Box", Journal of Statistical Software, http://www.jstatsoft.org, 2010.
Andrieu et al., "An introduction to MCMC for machine learning," Machine Learning, vol. 50, 5-43, 2003, Kluwer Academic Publishers, Manufactured in The Netherlands.
Smith et al., "Algorithm AS 53: Wishart Variate Generator" Journal of the Royal Statistical Society. Series C (Applied Statistics) 21 (3): 341¨C345. JSTOR 1972, pp. 341-345.
Schafer, "Analysis of Incomplete Multivariate Data," Chapman and Hall, London (1997).
Little et al., "Statistical Analysis with Missing Data," 2nd Edition, Wiley and Sons, 2002.
Box et al., "A Note on the Generation of Random Normal Deviates", The Annals of Mathematical Statistics, vol. 29, No. 2, Jan. 31, 1958.

* cited by examiner

50

| STORE ID (51) | UPC (52) | WEEK (54) | UNIT SALES (55) | UNIT PRICE (57) | MISSING DATA INDICATOR (58) |
|---|---|---|---|---|---|
| XXXXXX | 111111111 | 20060812 | - | - | 1 |
| YYYYYY | 111111111 | 20060826 | - | - | 1 |
| ZZZZZZ | 333333333 | 20060826 | 44 | $1.50 | 0 |
| AAAAAA | 444444444 | 20060812 | 37 | $1.57 | 0 |
| BBBBBB | 3333333333 | 20060826 | 20 | $1.64 | 0 |

59

FIG. 2

100

ALGORITHM 2 VARIATIONAL INFERENCE FOR PPTF

INPUT: THE TENSOR *R* WITH MISSING ENTRIES
OUTPUT: $\{\Theta^{(G)}, \Theta'^{(G)}\}$ INITIALIZE THE MODEL PARAMETERS $\{\Theta^{(0)}\}$.
for $g = 1 \ldots G$ do
VARIATIONAL E-STEP: ITERATE THROUGH (2)-(7) SEVERAL TIMES TO GET UPDATED VARIATIONAL PARAMETERS $\Theta'^{(g)}$ — 102
VARIATIONAL M-STEP: USE $\Theta'^{(g)}$ TO UPDATE MODEL PARAMETERS $\Theta^{(g)}$ FOLLOWING (8)-(14). — 105
end for

FIG. 4B

300

ALGORITHM 1 MCMC FOR BPTF

INPUT: THE TENSOR $R$ WITH MISSING ENTRIES
OUTPUT: $\{U^{(g)}, V^{(g)}, T^{(g)} \mid g = 1...G\}$ INITIALIZE THE LATENT FACTORS $\{U^{(0)}, V^{(0)}, T^{(0)}\}$.
for $g$ = 1...$G$ ITERATIONS do
SAMPLE MODEL PARAMETERS $\Theta_u$, $\Theta_v$, AND $\Theta_t$.
SAMPLE MODEL PARAMETERS $\Theta_u^{(g)} \sim p(\Theta_u \mid U^{(g-1)}, \Theta_0)$ FOLLOWING (15).
SAMPLE MODEL PARAMETERS $\Theta_v^{(g)} \sim p(\Theta_v \mid V^{(g-1)}, \Theta_0)$ FOLLOWING (16).
SAMPLE MODEL PARAMETERS $\Theta_t^{(g)} \sim p(\Theta_t \mid T^{(g-1)}, \Theta_0)$ FOLLOWING (17).
SAMPLE $\alpha$ FOLLOWING (21).
$\alpha^{(g)} \sim p(\alpha \mid U^{(g-1)}, V^{(g-1)} T^{(g-1)}, R)$.
305
for $i$ = 1...$I$ do
SAMPLE LATENT FACTORS $\mathbf{u}_i$ FOLLOWING (18).
$\mathbf{u}_i^{(g)} \sim p(\mathbf{u}_i \mid R, V^{(g-1)}, T^{(g-1)}, \Theta_u^{(g)}, \alpha^{(g)})$.
end for
for $j$ = 1...$J$ do
SAMPLE LATENT FACTORS $\mathbf{v}_j$ FOLLOWING (19).
$\mathbf{v}_j^{(g)} \sim p(\mathbf{v}_j \mid R, U^{(g)}, T^{(g-1)}, \Theta_v^{(g)}, \alpha^{(g)})$.
end for
for $k$ = 1...$K$ do
SAMPLE LATENT FACTORS $\mathbf{t}_k$ FOLLOWING (20).
$\mathbf{t}_k^{(g)} \sim p(\mathbf{t}_k \mid R, U^{(g)}, V^{(g)}, \Theta_t^{(g)} \alpha^{(g)})$.
end for
$U^{(g)} = \{u_1^{(g)}, \ldots, u_I^{(g)}\}$
$V^{(g)} = \{v_1^{(g)}, \ldots, v_J^{(g)}\}$
$T^{(g)} = \{t_1^{(g)}, \ldots, t_K^{(g)}\}$
end for
310

FIG. 5B

ON PRICE, 90% TRAINING

ON UNIT SALES, 90% TRAINING

ON PRICE, 10% TRAINING

ON UNIT SALES, 10% TRAINING

MULTIPLE IMPUTATION OF MISSING DATA IN MULTI-DIMENSIONAL RETAIL SALES DATA SETS VIA TENSOR FACTORIZATION

BACKGROUND

The present disclosure relates to methods for imputing missing data elements or values in data sets, generally, and retail data sets in particular, which are an important prerequisite for use in a variety of decision-support applications in a retail supply chain which decision-support applications are premised on the availability of complete relevant data with no missing data elements. More particularly, the present disclosure relates to a system and method for multiple imputation of missing data elements in retail data sets based on the multi-dimensional, tensor representation of these data sets.

Methods and structures for imputation of missing data elements in retail data sets is an important prerequisite for using these retail data sets in a variety of decision-support applications of interest to retail supply-chain entities such as consumer-product manufacturers, retail chains and individual retail stores; this prerequisite invariably arises since, in practice, decision-support applications require the relevant data sets to be complete with no missing values in them, whereas at the same time, it is often difficult or even impossible for various reasons to obtain such complete retail data sets. Examples of relevant decision-support applications include, but are not limited to, product demand forecasting, inventory optimization, strategic product pricing, product-line rationalization, and promotion planning.

Some retail data sets have a particular multi-dimensional structure and although this structure is common to many decision-support applications, it is often not explicitly specified or exploited in the method steps of the current modeling and analysis.

Two particular limitations of the prior art techniques that may be used for the imputation of missing data elements in retail data sets include: First, in the prior art, these missing data elements are typically replaced by certain point estimates for their relevant imputed values, and therefore, the complete data set resulting from this replacement does not capture the natural variability which would have resulted if these missing data elements had been actually recorded instead of being imputed, and as a consequence, this will lead to a statistical bias in any subsequent analysis using the complete data set; Second, the imputation procedures that are used in the prior art typically ignore any data correlations along the various data set dimensions, or may only consider these data correlations along a single dimension of the retail data set.

In a prior art embodiment of a retail sales data set that is commonly found in many decision-support applications, there is considered a time-series sequence of various specific quantities such as unit-sales, unit-prices, stock levels, delivery levels, unsold goods, discards, etc., for a specific time-period of interest, over a collection of products in a specified retail category of interest, and simultaneously over a collection of stores in the particular market geography of interest. For instance, in typical retail sales data sets, the typical time period for this reporting may be weekly, and data may be collected in a sequence of several months to several years over hundreds of products and stores.

In essence, therefore, these retail data sets have a multi-dimensional structure, with the specific quantities of interest mentioned above are measured and reported for a set of relevant products (whose elements are indexed by "p"), a set of relevant stores (whose elements are indexed by "s"), and the set of consecutive time-periods (whose elements are indexed by "t"), or equivalently, over a set of (p,s,t) combinations.

The use of multi-product and multi-store data, as described above, is of considerable value for any statistical analysis of interest in decision-support applications, even when, as is often the case, the specific focus of the statistical-modeling or decision-support application is confined to a single product, or to a small set of target products of interest. Specifically, even in this case, there may be examined data across multiple stores, or across the entire retail category, so that, for instance, while building statistical models, the data may be pooled across the stores to reduce the estimation errors for the model parameters. However, the inherent difficulty in acquiring this multi-dimensional data across the product, store and time-period dimensions invariably leads to these data sets having many missing data elements, which occur for specific combinations (p,s,t) of product "p", store "s" and time-period "t" in the data set.

In the retail environment, the reason for the presence of missing data elements for a particular (p,s,t) combination, may be ascribable to a variety of reasons, such as certain privacy and confidentiality issues in acquiring relevant data elements, or what is more likely in practice, the presence of certain process errors in the data logging, reporting or integration required for the compilation and assembling of the required retail data set.

It would be highly desirable to provide multi-product, multi-store and multi-time period data sets for demand modeling, that addresses a pervasive limitation that arises, in this regard, due to the invariable presence of missing data records and missing data elements in the relevant sales data sets for specific combinations of product "p", store "s" and time-period "t".

There is now considered some of the limitations of the prior art for the handling, specification and imputation of the missing data elements.

Generally, the prior art for missing value imputation in data sets have been developed in the context of statistical analysis in the presence of missing data, as reviewed by R. Little and D. Rubin, "Statistical Analysis with Missing Data," 2nd Edition, Wiley and Sons, 2002, and wherein, in general terms, the approaches are based on classifying the mechanism that is responsible for the pattern of missing values in the data sets. For instance, these missing value patterns would be termed "Missing Completely At Random" (or MCAR) if it is assumed that the probability of a given record having a missing data element is the same for all records (that is, the pattern of missing values is completely independent of the remaining variables and factors in the data set, so that excluding any data records with these missing data elements from the data set, as in the "record deletion" approach described below, does not lead to any statistical bias in the retained data records used for the demand modeling analysis). Although the MCAR assumption may be tenable for certain types of missing values in retail data sets, in most cases, the pattern of missing values will depend on other observed factors within the data set, and the resulting missing value patterns would be termed "Missing At Random" (or MAR). The remaining cases, wherein the pattern of missing values may depend on unobserved factors, or even on the magnitude of the missing value itself, are difficult to analyze and require explicit modeling.

One of the most common approaches in the prior art for handling missing data elements is to simply omit, ignore and exclude the entire set of data elements; however, for many statistical methods that require complete set of data elements for each data record that is used in the analysis, this approach is equivalent to deleting the entire record, which would even include many data elements that are non-missing. For instance, if the relevant record corresponded to the unit-sales for all the products in a given store, then the entire set of data elements would be excluded if the unit-sales for just a single product is missing; this is often referred to as the so-called "record deletion" approach in statistical analysis (equivalently, this is also referred to as the "complete case" approach). It can be readily seen that this "record deletion" approach leads to a significant reduction in the data set size, including the exclusion of valid and non-missing data elements in the retail data set which may have acquired at considerable effort and expense. Furthermore, it can also lead to significant statistical bias, as mentioned earlier, when the pattern of missing data elements depends on the values of the other data elements in the same data records, corresponding to the MAR case described earlier.

An alternative approach to "record deletion" that is also widely used in the prior art and does not have this deficiency of having to discard the entire record including the valid data elements, is termed "complete case" analysis, which in its simplest form consists of replacing the missing data elements in the sales data set by statistical estimates such as the mean value, either taken globally, or taken along some marginal dimension of the data set, and in this way to obtain a "complete" data set with the missing data elements filled in suitably. For example, a missing value for the data element corresponding to a certain (p,s,t) combination can be imputed by averaging the corresponding values over the other stores for the same (p,t) combination, or equivalently, across the store dimension, keeping (p,t) fixed. A similar approach can also be taken across the time dimension, that is, by averaging the corresponding values over time for the same (p,s) combination. However, this simplest approach of imputing the missing value by the replacing it by the corresponding mean value over the remaining non-missing data values along one or more dimensions of the data sets has the major disadvantage in that it deflates the variance and distorts the correlations for the measured quantity in the "complete" data set with these "mean-imputed" values.

More sophisticated methods for missing value imputation attempt to retain the naturally-occurring variance and correlation structures in the "complete" data set with the imputed values, and the most widely used approach is based on multiple imputation, as reviewed by J. L. Schafer, "Analysis of Incomplete Multivariate Data," Chapman and Hall, London (1997), wherein instead of a single set of imputed values for the missing data elements, instead multiple data sets are created with each complete data set contains a representative sample for the missing values with any variability or noise "added back in," and these multiple complete data sets are then used in subsequent analysis or decision-support procedures in suitable ways.

It would be highly desirable to provide an improved method for the specification or imputation of missing data elements in the retail data sets.

SUMMARY

In one aspect, there is provided a multiple imputation system, method and computer program product for multidimensional retail data sets in which multi-dimensional correlation structures are obtained and that are not considered individually and separately, but incorporated simultaneously as part of an overall multi-dimensional correlation structure.

In one embodiment, there is considered a system and method and computer program product for imputation of missing data elements in retail data sets that includes processing a correlation structure across multiple cross sections that are found in retail data sets. In one embodiment, rather than imposing smoothness requirements on the time dimension, it is assumed that the measurements in the time dimension are independent. In a further aspect, any smoothness requirements can always be incorporated by using lagged variables in the auxiliary data features along the time dimension. Furthermore, the estimation procedures described in the methodology of a further embodiment, are quite different from the estimation procedures used in the prior art for multiple imputation, and provide more generality and scalability for large data sets.

In one aspect, the system and method for multiple imputations in retail sales data sets comprises quantities measured over multiple dimension which typically include, a plurality of products, a plurality of stores, and a plurality of time-period values, or equivalently over a range of (p,s, t) values, wherein these retail data sets have missing data elements that are ascribable to various causes, for certain (p, s, t) combinations in this range.

Accordingly, in one embodiment, there is provided a computer-implemented method for multiple imputation for retail data sets with missing data elements. The method comprises receiving an original data set including elements including a plurality of retail products, a plurality of retail stores or chains, and a plurality of time-periods, with the retail products, retail stores and the time-periods; identifying and encoding the missing data elements in the original data set with dummy indicator variables corresponding to specific product, store and time-period combinations; obtaining a joint probability distribution of the magnitudes of the missing data elements in the original data set; generating a plurality of complete data sets corresponding to the original data set, wherein each complete data set in the plurality of complete data sets corresponds to the original data set with its non-missing values intact, and replacing, in each of the complete data sets, missing values indicated by the dummy variables with a sampled set of values from the joint probability distribution for the missing values obtained, wherein a programmed processor device performs one or more of one or more the receiving, identifying and encoding, obtaining, generating and replacing.

In one embodiment, a system for multiple imputation of data values for retail data sets with missing data elements comprises: at least one processor device; and at least one memory device connected to the processor, wherein the processor is programmed to perform a method, the method comprising: receiving an original data set including elements including a plurality of retail products, a plurality of retail stores or chains, and a plurality of time-periods, with the retail products, retail stores and the time-periods; identifying and encoding the missing data elements in the original data set with dummy indicator variables corresponding to specific product, store and time-period combinations; obtaining a joint probability distribution of the magnitudes of the missing data elements in the original data set; generating a plurality of complete data sets corresponding to the original data set, wherein each complete data set in the plurality of complete data sets corresponds to the original data set with its non-missing values intact, and, replacing, in each of the complete data sets, missing values indicated by the dummy variables with a sampled set of values from the joint probability distribution for the missing values obtained.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the accompanying description, serve to explain the principles of the invention. In the drawings.

FIG. 2 illustrates the structure of a retail sales data set that can be used in the present methodology according to one embodiment;

FIG. 4B illustrates one embodiment of a method using a variational EM algorithm 100 for implementing PPTF;

FIG. 5B illustrates one embodiment of a method 300 for estimating the joint posterior distribution over the parameters and hyper-parameters based on a Markov-chain Monte Carlo (MCMC) approach for generating samples;

DETAILED DESCRIPTION

A system, method and computer program product provides for accurate multiple imputation of missing data elements in retail data sets. As missing data elements are invariably present in these retail data sets, the specification or imputation of these missing data elements yields a "complete" data set for subsequent data analysis and modeling for various decision-support applications of interest based on this data.

That is, in one embodiment, there is implemented fast, scalable imputation methods suitable for large data sets, to obtain multiple complete data sets in which the original missing values are replaced by various imputed values, by using the method steps described herein.

Figure 1:
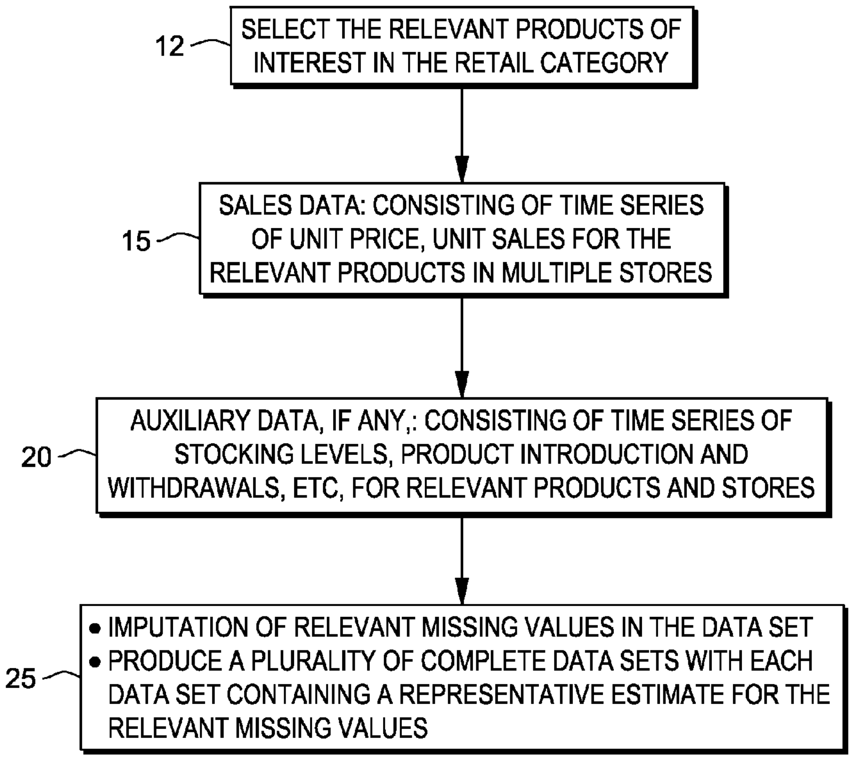
FIG. 1 illustrates method steps of the overall methodology for multiple imputations in retail sales data sets in one embodiment.

FIG. 1 is a high-level schematic of a computer implemented method 10 for generating multiple imputations in retail sales data sets in one embodiment. In one aspect, the method 10 is implemented in a client decision support application that requires a demand model or demand forecast for a set of relevant products for which an analysis data set is obtained by incorporating the data from a set of relevant data sources. A first step of method 10 includes selecting or specifying at 12 the relevant product choice set in a retail category.

One or more retail sales data sets are then obtained at 15, for example, by accessing a memory storage device such as a database, which data sets are used for the performing the relevant demand modeling analysis. For the set of relevant products, the analysis data set may include an aggregate retail-sales data set including, but not limited to: a set of time series for the unit sales and unit price over multiple stores.

In a further aspect, at 20, auxiliary data sets are obtained or accessed that include relevant information pertaining to the product and/or store attributes for the products and stores included as well as certain non-primary and auxiliary data, which may comprise, while not being limited to: any information pertaining to the introduction or withdrawal of products in certain stores during certain periods, or to any overstocking or lack of product inventory of products in certain stores during certain periods. This resulting data set contains missing data values for certain combinations of product, store, and time periods.

Then, the performing of the methodology described herein at step 25 results in a plurality of complete data sets with sampled estimates for the relevant missing values, with this plurality of multiple imputed data sets being used for subsequent statistical modeling and analysis for the client decision-support application.

FIG. 2 schematically illustrates the structure of a primary retail data set that can be used in the present methodology according to one embodiment; or equivalently, the analysis data set, in the case when the quantity variable in the retail data set is represented in a multidimensional form with respect to the product, store and time-period dimensions, with dummy indicator variables denoting the data elements with missing values. Particularly, an example retail data set, shown in the form of a data Table 50, includes the following data: time series of unit-price and unit-sales values for a time duration, e.g., a week or range of weeks, across multiple stores and across multiple products in the retail category and, includes dummy variables for missing data as will be explained in further detail.

In one example embodiment, the table 50 shown in FIG. 2 indicates sales data forming a multidimensional retail data with data populated from a data source for each product indicated as having a ProductID value (e.g., a Universal Product Category (UPC)), represented in a column 52, for each time period, e.g., week, as indicated by a weekID value in a column 54, for a specific and unique retail channel, such as a store, an outlet or an account store represented in column 51, and, includes the data records for the unit sales (including unit quantity (products sold) in column 55 and unit price of that product as represented by column 57. That is, each record in table 50 corresponds to a product from the relevant choice set in a given store and in a given time period, e.g., a week; and, table 50 may be indexed by the product identifier column 52 including values such as UPC or like barcode-implemented product identifier used for tracking products in retail stores. It is understood that data from a non-primary or auxiliary data source, in this example, may be additionally stored in a table 50 of FIG. 2 or, stored separately in a separate product attributes table (not shown).

In one embodiment, Table 50 shown in FIG. 2 includes missing data indicators 59 for missing data. As shown in FIG. 2, examples of "missing" rows in this data set are shown schematically, with each such row augmented by a dummy variable 59 having values of 0 (indicating no missing elements) or value of 1 indicating one or more missing elements) to be populated in column 58.

Figure 3:
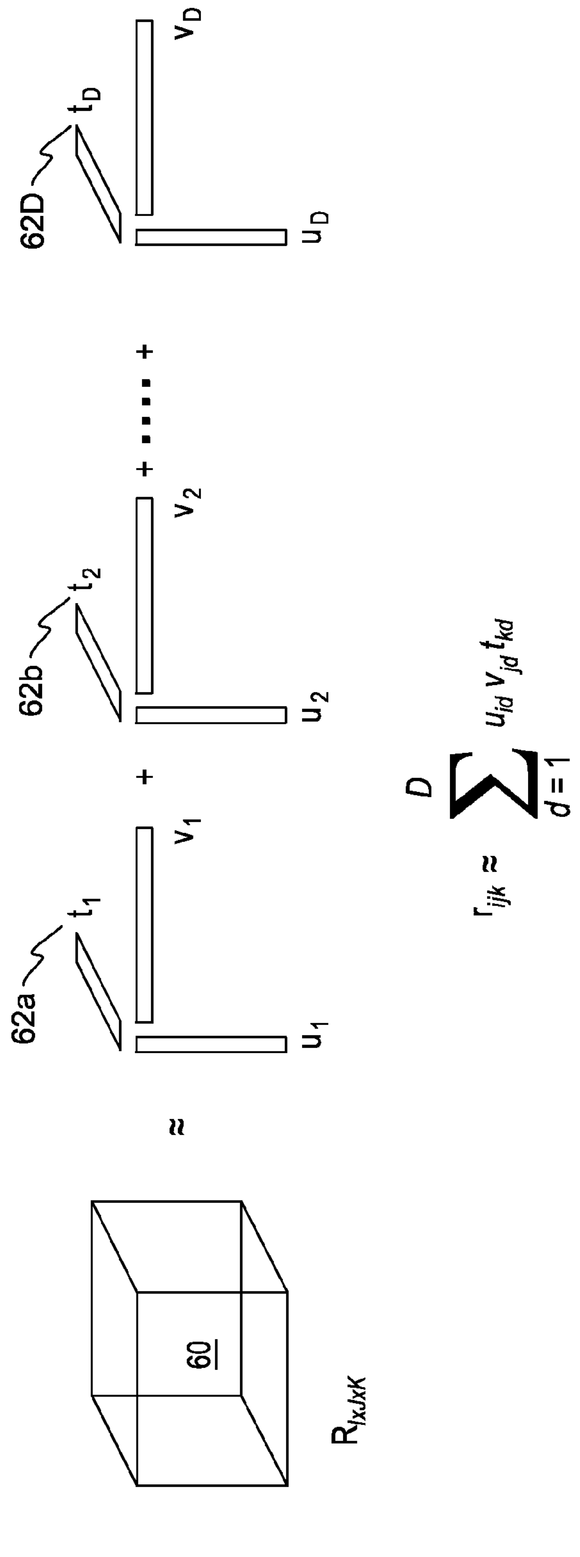
FIG. 3 illustrates the structure of the low-rank tensor factorization of the multidimensional retail data set in terms of the CANDECOMP/PARAFAC decomposition.

FIG. 3 illustrates conceptually a structure 60 of the low-rank tensor factorization of the multidimensional retail data set in terms of the CANDECOMP/PARAFAC decomposition, referred to herein as CP decompositions. If the tensor approximation indicated in FIG. 3 is exact, the tensor rank is D.

As known, CP decompositions factorize a tensor $R_{I \times J \times K}$ into a sum of component rank-one tensors 62*a*, 62*b*, . . . , 62D. In the computations, $U_{I \times D}$ denotes the aggregated matrix corresponding to the first factor so that $u_i$ is the D-dimensional vector of the $i^{th}$ row of U for i=1 . . . I. Let $V_{J \times D}$ and $T_{K \times D}$ be similarly defined. Then, each entry $r_{ijk}$ in R is defined as $r_{ijk}=u_i \cdot v_j \cdot t_k$, where, as shown in FIG. 3, $$u_i \cdot v_j \cdot t_k \equiv \sum_{d=1}^{D} u_{id} v_{jd} t_{kd}.$$

Figure 4A:
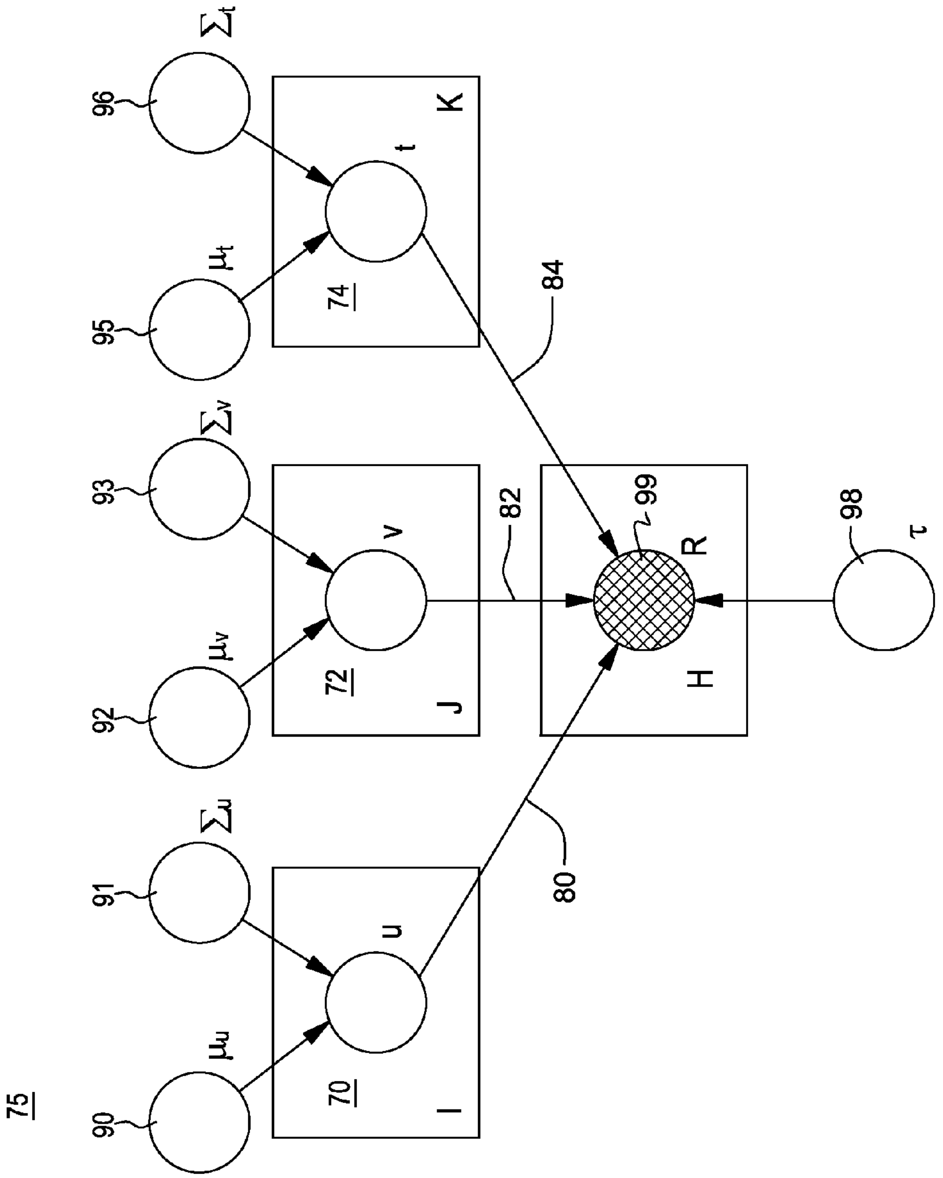
FIG. 4A illustrates the model for parametric probabilistic tensor factorization (PPTF) including a plate diagram and generative process of PPTF.

As described herein with respect to FIG. 4A, a plate diagram is used to represent the graphical models, i.e., graphical models representing a probabilistic model that describes the conditional independence structure between random variables. For example, if X1, X2 and X3 are three random variables, then X1 and X2 are conditionally independent given X3 if P(X1, X2|X3)=P(X1|X3) P(X2|X3), and if not, then X1, X2 are conditionally dependent given X3. The graphical model, in the case X1 and X2 are conditionally independent given X3 is a graph with X1, X2 and X3 at the nodes, with an edge between X1 and X3, and an edge between X1 and X2, but no edge between X1 and X2 indicating that these two random variables are independent given X3. In one embodiment, the graphical models represents a Bayesian model. A plate diagram provides a concise and uniform graphical language to represent the Graphical models. It is introduced in W. Buntine, "Operations for Learning with Graphical Models", Journal of Artificial Intelligence Research, 1994. As a uniform representation of graphical models, the plate diagram could be potentially be directly used as the input to automatic inference methods designed for graphical models, which may facilitate the practical use of graphical models.

FIG. 4A illustrates the model for parametric probabilistic tensor factorization (PPTF). including the plate diagram 75 (model) for parametric probabilistic tensor factorization (PPTF) and the generative process of PPTF 100 implemented by a computing system. The entries of the tensor $R_{I \times J \times K}$ are assumed to be independently generated from univariate normal distributions:

$$P(R \mid U, V, T, \tau) = \prod_{i=1}^{I} \prod_{j=1}^{J} \prod_{k=1}^{K} N(r_{ijk} \mid m_{ijk}, \tau)^{\delta_{ijk}},$$

where $\delta_{ijk}$=1 if $r_{ijk}$ is observed and 0 otherwise, and $m_{ijk}$ and τ are the mean and variance of the Gaussian distribution. In particular, the mean tensor $M=[m_{ijk}]$ has a CP decomposition in terms of matrices U, V, T, i.e., $$m_{ijk} = u_i \cdot v_j \cdot t_k \equiv \sum_{d=1}^{D} u_{id} v_{jd} t_{kd}.$$

The latent factors $u_i$ 80, $v_j$ 82, and $t_k$ 84 are generated from multivariate normal distributions $u_i$ 70, $v_j$ 72 and $t_k$ 74:

$u_i \sim N(\mu_u, \Sigma_u)$ $v_j \sim N(\mu_v, \Sigma_v)$ $t_k \sim N(\mu_t, \Sigma_t)$, N denotes a normal distribution, and model parameters are denoted $\mu_u$ 90, $\Sigma_u$ 91, $\mu_v$ 92, $\Sigma_v$ 93, $\mu_t$ 95, $\Sigma_t$ 96 and τ 98. The latent factors 80, 82, 84 are generated by one or more programmed processing units of a computing system according to the following method:

1. For each i, $[i]_1^I$ ($[i]_1^I$ is defined as i=1 . . . I), generate $u_i \sim N(\mu_u, \Sigma_u)$.
2. For each j, $[j]_1^J$, generate $v_j \sim N(\mu_v, \Sigma_v)$.
3. For each k, $[k]_1^K$, generate $t_k \sim N(\mu_t, \Sigma_t)$.
4. For each non-missing entry (i, j, k), $\tau_{ijk} \sim N(u_i \cdot v_j \cdot t_k, \tau)$, where $u_i \cdot v_j \cdot t_k = \Sigma_{d=1}^{D} u_{id} v_{jd} t_{kd}$.

Given the generative model, the likelihood function of PPTF is as follows:

$$p(R \mid \Theta) = \int_{U,V,T} \prod_{i=1}^{I} p\left(u_i \mid \mu_u, \sum_u\right) \prod_{j=1}^{J} p\left(v_j \mid \mu_v, \sum_v\right) \prod_{k=1}^{K} p\left(t_k \mid \mu_t, \sum_t\right) \prod_{i=1}^{I} \prod_{j=1}^{J} \prod_{k=1}^{K} p(r_{ijk} \mid U, V, T, \tau)^{\delta_{ijk}} d\{U, V, T\},$$

where $\Theta=\{\mu_u, \Sigma_u, \mu_v, \Sigma_v, \mu_t, \mu_t, \Sigma_t, \tau\}$ denotes all the model parameters.

Given R 99, one embodiment includes obtaining the model parameters Θ such that p(R|Θ) is maximized. A general approach is to use the expectation maximization (EM) algorithm, which is reviewed in R. Neal and G. Hinton, "A view of the EM algorithm that justifies incremental, sparse, and other variants," Learning in Graphical Models, M. Jordan, Ed. MIT Press, 1998. In EM, there is calculated the posterior over latent variables p(U,V,T|R,Θ) in the E-step and estimate model parameters Θ in the M-step. However, the calculation of posterior for PPTF is intractable, implying that a direct application of EM is not feasible. Therefore, one embodiment is based on a variational EM algorithm to obtain the model parameters. Variational inference is reviewed in M. Wainwright and M. Jordan, "Graphical models, exponential families, and variational inference," Foundations and Trends in Machine Learning, vol. 1, no. 1-2, 2008. In particular, a fully factorized distribution q(U,V,T|Θ') is introduced as an approximation of the true posterior p(U,V,T|R,Θ):

$$q(U,V,T\mid\Theta')=\prod_{i=1}^{I}q(u_i\mid m_{ui},\mathrm{diag}(w_{ui}))\prod_{j=1}^{J}p(v_j\mid m_{vj},\mathrm{diag}(w_{vj}))\prod_{k=1}^{K}p(t_k\mid m_{tk},\mathrm{diag}(w_{tk})),$$

where $\Theta'=\{m_{ui}, m_{vj}, m_{tk}, w_{ui}, w_{vj}, w_{tk}, [i]_1^I, [j]_1^J, [k]_1^K\}$ are variational parameters. All variational parameters are D-dimensional vectors, and $\mathrm{diag}(w_{ui})$ denotes a square matrix with $w_{ui}$ on the diagonal.

Given $q(U,V,T|\Theta')$, applying Jensen's inequality (described by M. Wainwright and M. Jordan in "Graphical models, exponential families, and variational inference," Foundations and Trends in Machine Learning, vol. 1, no. 1-2, 2008) yields a lower bound to the original log-likelihood of R:

$$\log p(R|\Theta)\geq E_q[\log p(U,V,T,R|\Theta)]-E_q[\log q(U,V,T|\Theta')].$$

Denoting the lower bound using $L(\Theta, \Theta')$, $L(\Theta, \Theta')$ is expanded as:

$$L(\Theta,\Theta')=E_q\left[\log\frac{p(U\mid\Theta)}{q(U\mid\Theta')}\right]+E_q\left[\log\frac{p(V\mid\Theta)}{q(V\mid\Theta')}\right]+E_q\left[\log\frac{p(T\mid\Theta)}{q(T\mid\Theta')}\right]+E_q[\log p(R\mid\Theta,U,V,T)]. \tag{1}$$

The first term is given by $$E_q\left[\log\frac{p(U\mid\Theta)}{q(U\mid\Theta')}\right]=-\frac{ID}{2}\log 2\pi+\frac{I}{2}\log\left|\Sigma_u^{-1}\right|-\frac{1}{2}\sum_{i=1}^{I}\left\{Tr\left(\Sigma_u^{-1}\mathrm{diag}(w_{ui})\right)+(m_{ui}-\mu_u)^T\Sigma_u^{-1}(m_{ui}-\mu_u)\right\}+\frac{ID}{2}+\frac{ID}{2}\log 2\pi+\frac{1}{2}\sum_{i=1}^{I}\sum_{d=1}^{D}\log w_{uid},$$

and the terms $$E_q\left[\log\frac{p(V\mid\Theta)}{q(V\mid\Theta')}\right],\ E_q\left[\log\frac{p(T\mid\Theta)}{q(T\mid\Theta')}\right]$$

have a similar form.

For $E_q[\log p(R|\Theta,U,V,T)]$, there is computed $$E_q[\log p(R\mid U,V,T,\tau)]=-\frac{1}{2\tau}\sum_{i=1}^{I}\sum_{j=1}^{J}\sum_{k=1}^{K}\delta_{ijk}\left\{r_{ijk}^2-2r_{ijk}\sum_{d=1}^{D}E_q[u_{id}v_{jd}t_{kd}]+E_q\left[\left(\sum_{d=1}^{D}u_{id}v_{jd}t_{kd}\right)^2\right]\right\}-\frac{H}{2}\log 2\pi\tau,$$

where H is the total number of non-missing entries in the tensor, and $E_q[u_{id}v_{jd}t_{kd}]$ and $E_q[(\Sigma_d u_{id}v_{id}t_{kd})^2]$ are given as follows:

$$E_q[u_{id}v_{jd}t_{kd}]=m_{uid}m_{vjd}m_{tkd},$$

and $$E_q\left[\left(\sum_{d=1}^{D}u_{id}v_{jd}t_{kd}\right)^2\right]=\left(\sum_{d=1}^{D}m_{uid}m_{vjd}m_{tkd}\right)^2+\sum_{d=1}^{D}(m_{uid}^2m_{vjd}^2w_{tkd}+m_{uid}^2w_{vjd}m_{tkd}^2+w_{uid}m_{vjd}^2m_{tkd}^2+m_{uid}^2w_{vjd}w_{tkd}+w_{uid}m_{vjd}^2w_{tkd}+w_{uid}w_{vjd}m_{tkd}^2+w_{uid}w_{vjd}w_{tkd}).$$

FIG. 4B illustrates the method steps 100 of the variational EM algorithm for implementing PPTF. In the variational E-step 102, the best lower bound function is found by maximizing $L(\Theta,\Theta'')$ w.r.t. $\Theta'$. In particular, there is computed:

$$m_{ui}^*=\left\{\Sigma_u^{-1}+\frac{1}{\tau}\sum_{jk}\delta_{ijk}[m_{jk}m_{jk}^T+\mathrm{diag}(m_{vj}^2\circ w_{tk}+m_{tk}^2\circ w_{vj}+w_{vj}\circ w_{tk})]\right\}^{-1}\left(\Sigma_u^{-1}\mu_u+\frac{1}{\tau}\sum_{jk}\delta_{ijk}r_{ijk}m_{vj}\circ m_{tk}\right) \tag{2}$$

$$w_{uid}^*=1\Big/\left(\Sigma_{u,dd}^{-1}+\frac{1}{\tau}\sum_{jk}\delta_{ijk}\{m_{vjd}^2m_{tkd}^2+m_{vjd}^2w_{tkd}+w_{vjd}m_{tkd}^2+w_{vjd}w_{tkd}\right), \tag{3}$$

where $m_{vj}^2$ is elementwise square, same for $m_{tk}^2$, $\circ$ is the elementwise product, $m_{jk}=m_{vj}\circ m_{tk}$, and $\Sigma_{u,dd}^{-1}$ is the $d^{th}$ element on the diagonal of $\Sigma_u^{-1}$.

For $m_{vj}$ and $w_{vj}$, there is computed $$m_{vj}^*=\left\{\Sigma_v^{-1}+\frac{1}{\tau}\sum_{ik}\delta_{ijk}[m_{ik}m_{ik}^T+\mathrm{diag}(m_{ui}^2\circ w_{tk}+m_{tk}^2\circ w_{ui}+w_{ui}\circ w_{tk})]\right\}^{-1}\left(\Sigma_v^{-1}\mu_v+\frac{1}{\tau}\sum_{jk}\delta_{ijk}r_{ijk}m_{vj}\circ m_{tk}\right) \tag{4}$$

$$w_{vjd}^*=1\Big/\left(\Sigma_{v,dd}^{-1}+\frac{1}{\tau}\sum_{ik}\delta_{ijk}\{m_{uid}^2m_{tkd}^2+m_{uid}^2w_{tkd}+w_{uid}m_{tkd}^2+w_{uid}w_{tkd}\right), \tag{5}$$

where $m_{ik}=m_{ui}\circ m_{tk}$.

For $m_{tk}$ and $w_{tk}$, there is computed $$m_{tk}^{*} = \left\{\sum_{t}^{-1} + \frac{1}{\tau}\sum_{ij}\delta_{ijk}\left[m_{ij}m_{ij}^{T} + \mathrm{diag}(m_{ui}^{2}\circ w_{vj} + m_{vj}^{2}\circ w_{ui} + w_{ui}\circ w_{vj})\right]\right\}^{-1} \left(\sum_{t}^{-1}\mu_t + \frac{1}{\tau}\sum_{ij}\delta_{ijk}r_{ijk}m_{ui}\circ m_{vj}\right) \quad (6)$$

$$w_{tkd}^{*} = 1\Big/\left(\sum_{t,dd}^{-1} + \frac{1}{\tau}\sum_{ij}\delta_{ijk}\{m_{uid}^{2}m_{vjd}^{2} + m_{uid}^{2}w_{vjd} + w_{uid}m_{vjd}^{2} + w_{uid}w_{vjd}\}\right), \quad (7)$$

where $m_{ij}=m_{ui}\circ m_{vj}$.

Thus, the variational E step in FIG. 4A runs through formulae (2)-(7). Variational parameters Θ'* from running the E-step 102 gives the best lower bound function L(Θ,Θ'*). In the variational M-step 105, maximizing L(Θ,Θ'*) w.r.t. Θ yields the estimation of the model parameters:

$$\mu_u^{*} = \frac{1}{I}\sum_{i=1}^{I} m_{ui} \quad (8)$$

$$\sum_{u}^{*} = \frac{1}{I}\sum_{i=1}^{I}\{\mathrm{diag}(w_{ui}) + (m_{ui}-\mu_u)(m_{ui}-\mu_u)^{T}\} \quad (9)$$

$$\mu_v^{*} = \frac{1}{J}\sum_{j=1}^{J} m_{vj} \quad (10)$$

$$\sum_{v}^{*} = \frac{1}{J}\sum_{j=1}^{J}\{\mathrm{diag}(w_{vj}) + (m_{vj}-\mu_u)(m_{vj}-\mu_v)^{T}\} \quad (11)$$

$$\mu_t^{*} = \frac{1}{K}\sum_{k=1}^{K} m_{tk} \quad (12)$$

$$\sum_{t}^{*} = \frac{1}{K}\sum_{k=1}^{K}\{\mathrm{diag}(w_{tk}) + (m_{tk}-\mu_u)(m_{tk}-\mu_t)^{T}\} \quad (13)$$

$$\tau^{*} = \frac{1}{H}\sum_{ijk}\delta_{ijk}\left\{r_{ijk}^{2} - 2r_{ijk}\sum_{d}E_q[u_{id}v_{jd}t_{kd}] + E_q\left[\left(\sum_{d}u_{id}v_{jd}t_{kd}\right)^{2}\right]\right\}, \quad (14)$$

where H is the total number of non-missing entries in the tensor 99. Variational M step in FIG. 4A runs through formulae (8)-(14) to yield the estimated model parameters.

In one embodiment, to predict the entry (i,j,k) using point estimate, there is computed $$\hat{r}_{ijk} = \hat{u}_i\cdot\hat{v}_j\cdot\hat{t}_k = \sum_{d=1}^{D}\hat{u}_{id}\hat{v}_{jd}\hat{t}_{kd}.$$

A maximum a posteriori (MAP) estimate is used to estimate $\{\hat{u}_i, \hat{v}_j, \hat{t}_k\}$. MAP estimate is reviewed in M. DeGroot, Optimal Statistical Decisions, McGraw-Hill, 1970. It maximizes the posterior distribution of a random variable given its prior and the observations. In particular, for PPTF, there is computed:

$$\{\hat{u}_i, \hat{v}_j, \hat{t}_k\} = \underset{u_i\cdot v_j\cdot t_k}{\mathrm{argmax}}\, p(u_i, v_j, t_k \mid R, \Theta) \approx \underset{u_i\cdot v_j\cdot t_k}{\mathrm{argmax}}\, q(u_i, v_j, t_k \mid \Theta') = \{m_{ui}, m_{vj}, m_{tk}\}.$$

For multiple imputation, an approximation $\hat{M}$ is constructed for the mean tensor using $\hat{m}_{ijk}=\hat{u}_i\cdot\hat{v}_j\cdot\hat{t}_k$. Then, if $r_{ijk}$ is missing, there can be drawn multiple samples of $r_{ijk}$ from univariate normal $N(\hat{m}_{ijk},\tau)$.

Figure 4C:
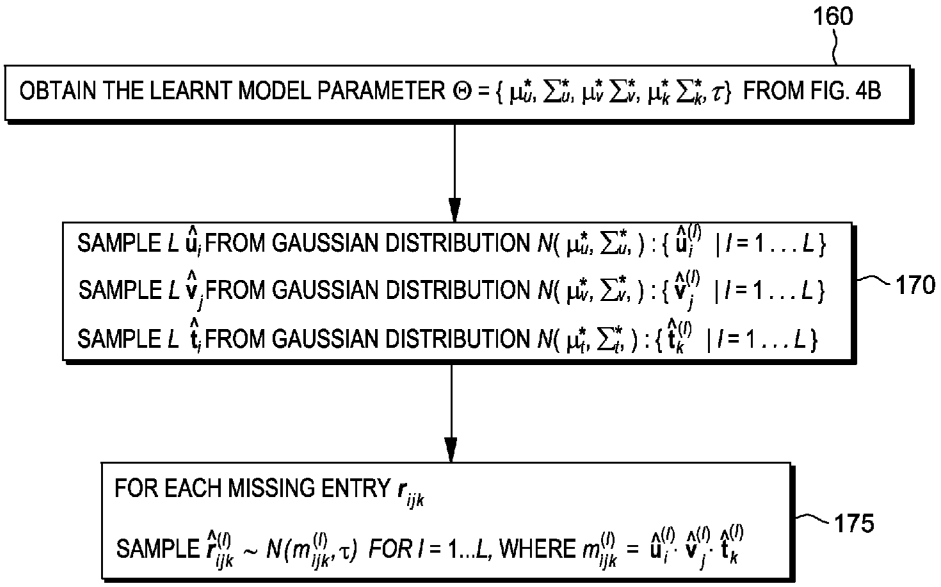
FIG. 4C illustrates one embodiment of a method for multiple imputation using PPTF.

The method steps 150 for multiple imputation is illustrated in FIG. 4C. In FIG. 4C, at 160, given $(\mu_u^*,\Sigma_u^*)$ from (8) and (9), at 170, the Gaussian distribution $N(\mu_u^*,\Sigma_u^*)$ for $u_i$, can be sampled to obtain L different sample values for $u_i$: $\{u_i^{(l)}|l=1\ldots L\}$. Similarly, given $(\mu_v^*, \Sigma_v^*)$ from (10) and (11), the Gaussian distribution $N(\mu_v^*,\Sigma_v^*)$ can be sampled to obtain L different sample values for $v_j$: $\{v_j^{(l)}|l=1\ldots L\}$. Finally, at 160, given $(\mu_v^*,\Sigma_v^*)$ from (12) and (13), at 170 the Gaussian distribution $N(\mu_k^*,\Sigma_k^*)$ can be sampled for L different values for $t_k$: $\{t_k^{(l)}|l=1\ldots L\}$ respectively. Then, in FIG. 4C, at 175, using $\{u_i^{(l)}|l=1\ldots L\}$, $\{v_j^{(l)}|l=1\ldots L\}$ and $\{t_k^{(l)}|l=1\ldots L\}$, there is then constructed L mean tensors $\hat{M}^{(l)}$ with each entry given by $\hat{m}_{ijk}^{(l)}$ given by $\hat{m}_{ijk}^{(l)}=\hat{u}_i^{(l)}\cdot\hat{v}_j^{(l)}\cdot\hat{t}_k^{(l)}$, then $\{\hat{M}^{(l)},\tau\}$ becomes the parameters for I×J×K univariate Gaussian distributions $N(\hat{m}_{ijk}^{(l)},\tau)$; in this way one sample or multiple samples can be obtained from $N(\hat{m}_{ijk}^{(l)},\tau)$, depending on the application.

Figure 5A:
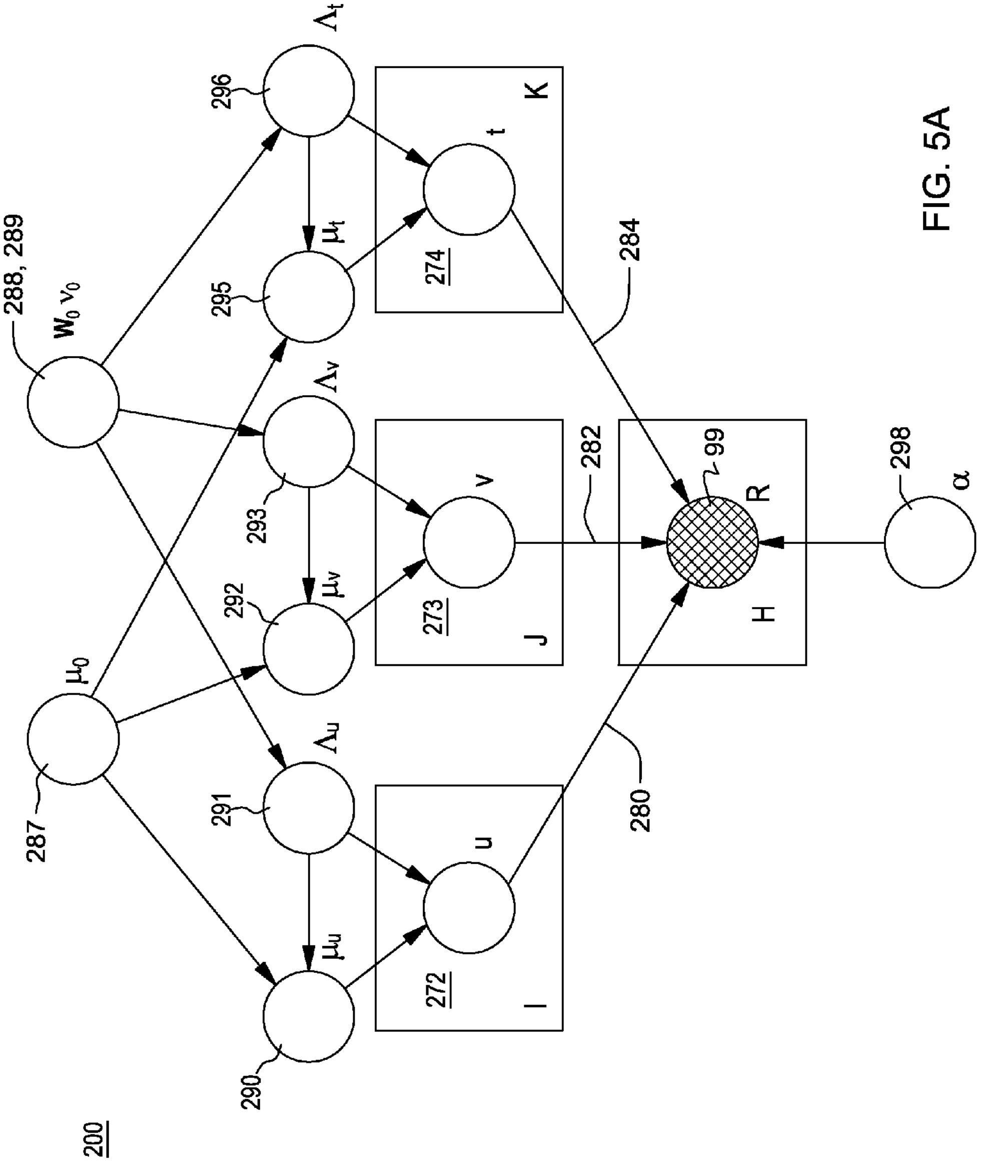
FIG. 5A illustrates one embodiment of a model for Bayesian probabilistic tensor factorization (BPTF) including the plate diagram 200.

FIG. 5A illustrates the model for Bayesian probabilistic tensor factorization (BPTF) including the plate diagram 200. The plate diagram 200 shows the joint distribution over the random variables, parameters $\mu_u$ 290, $\Lambda_u$ 291, $\mu_v$ 292, $\Lambda_v$ 293, $\mu_t$ 295 and $\Lambda_t$ 296, (with μ representing a mean and Λ representing a precision matrix for the Gaussian distribution to generate the latent factors $u_i$ 280, $v_j$ 282 and $t_k$ 284), and hyper-parameters $\mu_0$ 287, $W_0$ 288 (representing a D×D scale matrix), and $v_0$ 288 (representing degrees of freedom) are the parameters for the normal-Wishart prior in a Bayesian probabilistic tensor factorization (BPTF) model as a full Bayesian extension of PPTF for the estimation of the missing entries of the retail data set. In particular, the entries of the tensor are assumed to be independently generated from univariate normal distributions:

$$P(R \mid U, V, T, \alpha) = \prod_{i=1}^{I}\prod_{j=1}^{J}\prod_{k=1}^{K} N(r_{ijk} \mid m_{ijk}, \alpha^{-1})^{\delta_{ijk}},$$

where $\alpha^{-1}$ is the precision for the Gaussian distribution and $$m_{ijk} = u_i\cdot v_j\cdot t_k = \sum_{d=1}^{D} u_{id}v_{jd}t_{kd}.$$

As a Bayesian model, BPTF maintains prior distributions over U,V,T,α. In particular, BPTF model assumes multivariate normal priors over $u_i$, $v_j$, and $t_k$:

$u_i \sim N(\mu_u, \Lambda_u^{-1})$ $v_j \sim N(\mu_v, \Lambda_v^{-1})$ $t_k \sim N(\mu_t, \Lambda_t^{-1})$.

Here $\mu$ denotes the mean and $\Lambda$ denotes the precision matrix for the factors. In one embodiment, the latent factors 280, 282, 284 are generated by one or more programmed processing units of a computing system according to the following generative process of BPTF:

1. Generate $\Lambda_u$, $\Lambda_v$, $\Lambda_t \sim W(W_0, v_0)$. $W(W_0, v_0)$ is the Wishart distribution with $v_0$ degrees of freedom and a D×D scale matrix $W_0$. In particular, $$\mathcal{W}(\Lambda \mid W_0 \cdot v_0) = \frac{1}{C}|\Lambda|^{(v_0-D-1)}\exp\left(-\frac{1}{2}Tr(W_0^{-1}\Lambda)\right).$$

where C is the constant for normalization.

2. Generate $\mu_u \sim N(\mu_0, c_0\Lambda_u^{-1})$, $\mu_v \sim N(\mu_0, c_0\Lambda_v^{-1})$, $\mu_t \sim N(\mu_0, c_0\Lambda_t^{-1})$, where $\Lambda_u$, $\Lambda_v$, and $\Lambda_t$ are used as the precision matrices for Gaussians.
3. Generate $\alpha \sim W(\overline{W}_0, \overline{v}_0)$.
4. For each i, $[i]_1^I$, generate $u_i \sim N(\mu_u, \Lambda_u^{-1})$.
5. For each k, $[k]_1^J$, generate $v_j \sim N(\mu_v, \Lambda_v^{-1})$.
6. For each k, $[k]_1^K$, generate $t_k \sim N(\mu_t, \Lambda_t^{-1})$.
7. For each non-missing entry (i, j, k), generate $r_{ijk} \sim N(u_i \cdot v_j \cdot t_k, \alpha^{-1})$.

The programmed method continues by letting $\Theta_u=(\mu_u, \Lambda_u)$, $\Theta_v=(\mu_v, \Lambda_v)$, $\Theta_t=(\mu_t, \Lambda_t)$. The parameters $\Theta_u$, $\Theta_v$, $\Theta_t$ for each factor also has normal-Wishart hyperpriors. In particular, for some fixed hyperparameters $\mu_0 \in R^D$ and $W_0 \in R^{D\times D}$ with $W_0>0$, there is defined:

$$p(\Theta_u|\mu_0,W_0)=p(\mu_u,\Lambda_u)=p(\mu_u|\Lambda_u)p(\Lambda_u):N(\mu_u|\mu_0,(c_0\Lambda_u)^{-1})W(\Lambda_u|W_0,v_0)p(\Theta_v|\mu_0,W_0)=p(\mu_v,\Lambda v)=p(\mu_v|\Lambda_v)p(\Lambda_v):N(\mu_v|\mu_0,(c_0\Lambda_v)^{-1})W(A_v|W_0,v_0)p(\Theta_t|\mu_0,W_0)=p(\mu_t,\Lambda_t)=p(\mu_t|\Lambda_t)p(\Lambda_t):N(\mu_t|\mu_0,(c_0\Lambda_t)^{-1})W(\Lambda_t|W_0,v_0).$$

where $W(\cdot|W_0,v_0)$ is the Wishart distribution with $v_0$ degrees of freedom and a D×D scale matrix $W_0$. In addition, $\alpha$ has a Gamma prior:

$$p(\alpha)\sim W(\alpha|\overline{W}_0,\overline{v}_0).$$

The likelihood conditioned on the hyperparameters can be written as:

$$p(R|\mu_0,W_0,v_0,\overline{W}_o,\overline{v}_0)=\int_{U,V,T}\int_{\Theta_u,\Theta_v,\Theta_t}\int_\alpha p(R,U,V,T,\Theta_u,\Theta_v,\Theta_t,\alpha|\mu_0,W_0,v_0,\overline{W}_0,\overline{v}_0)d\{U,V,T\}d\{\Theta_u,\Theta_v,\Theta_t\}d\alpha.$$

The distribution of an unknown entry $r_{ijk}$ given the observable tensor R is obtained from $$p(r_{ijk}|R,\Theta_0)=\int_{U,V,T}\int_{\Theta_u,\Theta_v,\Theta_t}\int_\alpha p(\hat{r}_{ijk}|u_i,v_j,t_k,\alpha)p(U|\Theta_u)p(U|\Theta_u)p(V|\Theta_v)p(T|\Theta_t)p(\Theta_u,\Theta_v,\Theta_t,\alpha|\Theta_0)d\{U,V,T\}d\{\Theta_u,\Theta_v,\Theta_t\}d\alpha.$$

Sampling from this posterior distribution will provide the required multiple imputations of the missing entries. However, since direct computation of the integral is intractable, one embodiment uses a sampling based methods for approximating the posterior distribution as needed FIG. 5B illustrates the method steps 300 of a further embodiment for estimating the joint posterior distribution over the parameters and hyper-parameters based on a Markov-chain Monte Carlo (MCMC) approach for generating samples from the joint posterior distribution. An introduction of MCMC method is given in C. Andrieu, N. Freitas, A. Doucet, and M. Jordan, "An introduction to MCMC for machine learning," Machine Learning, vol, 50, 2003. There are two sets of hidden variables to consider: the parameter sets $(\Theta_u,\Theta_v,\Theta_t)$ and the factors (U,V,T).

Since $\Theta_u=\{\mu_u\Lambda_u\}$ is conditionally independent of all variables given U, i.e., given U, $\Theta_u$ is independent of other variables, hence, its conditional probability is given by:

$$p(\mu_u, \Lambda_u \mid U, \Theta_0) = N(\mu_u \mid \mu_0^*, (c_0^*\Lambda_u)^{-1})W(\Lambda_u \mid W_0^*, v_0^*), \tag{15}$$

where $$\mu_0^* = \frac{c_0\mu_0 + I\overline{u}}{c_0 + I}, \; c_0^* = c_0 + I, \; v_0^* = v_0 + I$$

$$W_0^* = \left(W_0^{-1} + S + \frac{c_0 I}{c_0 + I}(\overline{u} - \mu_0)(\overline{u} - \mu_0)^T\right)^{-1}$$

$$S = \sum_{i=1}^{I}(u_i - \overline{u})(u_i - \overline{u})^T, \; \overline{u} = \frac{1}{I}\sum_{i=1}^{I}u_i.$$

Similarly, the conditional distribution for $\Theta_v=\{\mu_v, \Lambda_v\}$ is given by:

$$p(\mu_v, \Lambda_v \mid V, \Theta_0) = N(\mu_v \mid \mu_0^*, (c_0^*\Lambda_v)^{-1})W(\Lambda_v \mid W_0^*, v_0^*), \tag{16}$$

where $$\mu_0^* = \frac{c_0\mu_0 J\overline{v}}{c_0 + J}, \; c_0^* = c_0 + J, \; v_0^* = v_0 + J$$

$$W_0^* = \left(W_0^{-1} + S + \frac{c_0 J}{c_0 + J}(\overline{v} - \mu_0)(\overline{v} - \mu_0)^T\right)^{-1}$$

$$S = \sum_{j=1}^{J}(v_j - \overline{v})(v_i - \overline{v})^T, \; \overline{v} = \frac{1}{J}\sum_{j=1}^{J}v_j.$$

The conditional distribution for $\Theta_t=\{\mu_t, \Lambda_t\}$ is given by:

$$p(\mu_t, \Lambda_t \mid T, \Theta_0) = N(\mu_t \mid \mu_0^*, (c_0^*\Lambda_t)^{-1})W(\Lambda_t \mid W_0^*, v_0^*), \tag{17}$$

where $$\mu_0^* = \frac{c_0\mu_0 + K\overline{t}}{c_0 + K}, \; c_0^* = c_0 + K, \; v_0^* = v_0 + K$$

$$W_0^* = \left(W_0^{-1} + S + \frac{c_0 K}{c_0 + K}(\overline{t} - \mu_0)(\overline{t} - \mu_0)^T\right)^{-1}$$

$$S = \sum_{k=1}^{K}(t_k - \overline{t})(t_k - \overline{t})^T, \; \overline{t} = \frac{1}{K}\sum_{k=1}^{K}t_k.$$

The conditional distribution of the matrix U factorizes over individual components $u_i$, which are conditionally independent of $\Theta_v$ and $\Theta_t$. Hence, there is computed:

$$p(U \mid R, V, T, \mu_u, \Lambda_u, \alpha) = \prod_{i=1}^{I} p(u_i \mid R, V, T, \mu_u, \Lambda_u, \alpha). \tag{18}$$

and $$p(u_i \mid R, V, T, \mu_u, \Lambda_u, \alpha) = N(\mu_u^*, [\Lambda_u^*]^{-1}),$$

with $$\Lambda_u^* = \Lambda_u + \alpha\sum_{jk}\delta_{ijk}q_{jk}q_{jk}^T$$

$$\mu_u^* = (\Lambda_u^*)^{-1}\left(\alpha\sum_{jk}\delta_{ijk}r_{ijk}q_{jk} + \Lambda_u\mu_u\right),$$

where

-continued $$q_{jk} = v_j \circ t_k.$$

Similarly, the conditional distribution for V is given by $$p(V \mid R, U, T, \mu_v, \Lambda_v, \alpha) = \prod_{j=1}^{J} p(v_j \mid R, U, T, \mu_v, \Lambda_v, \alpha). \tag{19}$$

and $$p(v_j \mid R, U, T, \mu_v, \Lambda_v, \alpha) = N(\mu_v^*, [\Lambda_v^*]^{-1}),$$

where $$\Lambda_v^* = \Lambda_v + \alpha \sum_{ik} \delta_{ijk} q_{ik} q_{ik}^T$$

$$\mu_v^* = (\Lambda_v^*)^{-1}\left(\alpha \sum_{ik} \delta_{ijk} r_{ijk} q_{ik} + \Lambda_v \mu_v\right).$$

The conditional distribution for T is given by $$p(T \mid R, U, V, \mu_t, \Lambda_t, \alpha) = \prod_{k=1}^{K} p(t_k \mid R, U, V, \mu_t, \Lambda_t, \alpha). \tag{20}$$

and $$p(t_k \mid R, U, V, \mu_t, \Lambda_t, \alpha) = N(\mu_t^*, [\Lambda_t^*]^{-1}),$$

where $$\Lambda_t^* = \Lambda_t + \alpha \sum_{ij} \delta_{ijk} q_{ij} q_{ij}^T$$

$$\mu_t^* = (\Lambda_t^*)^{-1}\left(\alpha \sum_{ij} \delta_{ijk} r_{ijk} q_{ij} + \Lambda_t \mu_t\right).$$

The conditional distribution of α is given by $$p(\alpha \mid R, U, V, T) = W(\alpha \mid \overline{W}_0^*, \overline{v}_0^*), \tag{21}$$

with $$\overline{v}_0^* = \overline{\gamma}_0 + N$$

$$(\overline{W}_0^*)^{-1} = \overline{W}_0^{-1} + \sum_{i=1}^{I} \sum_{j=1}^{J} \sum_{k=1}^{K} \delta_{ijk} (r_{ijk} - u_i \cdot v_j \cdot t_k)^2.$$

The method steps 300 based on the MCMC algorithm require cyclically sampling, according to loop index "g" the parameters ($\Theta_u$, $\Theta_v$, $\Theta_T$, α) at 305 according to equations (15)-(17), and the factors (U,V,T) at 310 according to equations (18)-(20), and after numerous cycles, the MCMC algorithm converges to the stationary distribution which can be regarded as the true posterior, from which samples can be obtained for the following potential requirements:

(1) To obtain independent estimates for the factors $\{U^{(g)}, V^{(g)}, T^{(g)}\}$, vide FIG. 5B.

(2) To obtain independent estimates of M; in this respect L samples are taken vide FIG. 5B, and M is obtained as $$m_{ijk} = \frac{1}{L} \sum_{l=1}^{L} u_i^{(l)} \cdot v_j^{(l)} \cdot t_k^{(l)}.$$

Figure 5C:
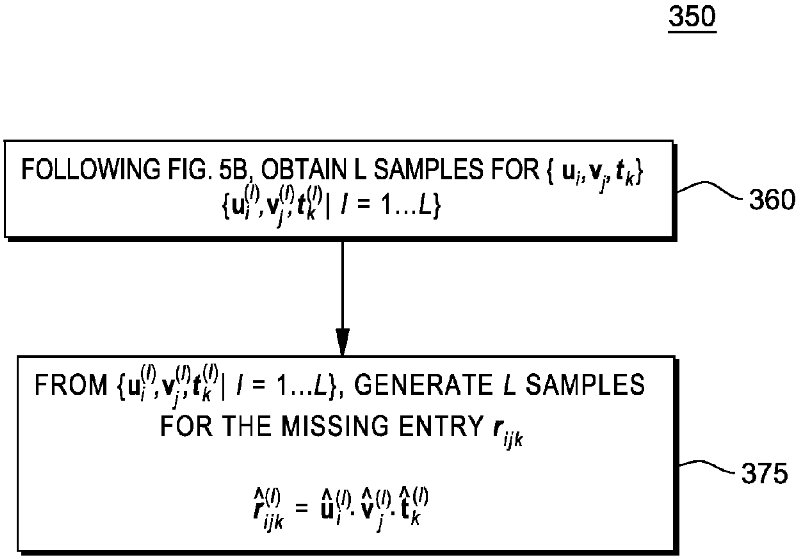
FIG. 5C illustrates one embodiment of a method for multiple imputation using BPTF.

(3) To construct multiple imputations for the missing values reference is now had to the method 350 shown FIG. 5C; in this respect, after obtaining L samples of $u_i^{(l)}$, $v_j^{(l)}$, $t_k^{(l)}$ as indicated at 360, for each missing entry $r_{ijk}$, multiple samples $r_{ijk}^{(l)}$ (l=1 . . . L) are taken as $\hat{r}_{ijk}^{(l)} = \hat{u}_i^{(l)} \cdot \hat{v}_j^{(l)} \cdot \hat{t}_k^{(l)}$ as indicated at 375.

Figure 6A:
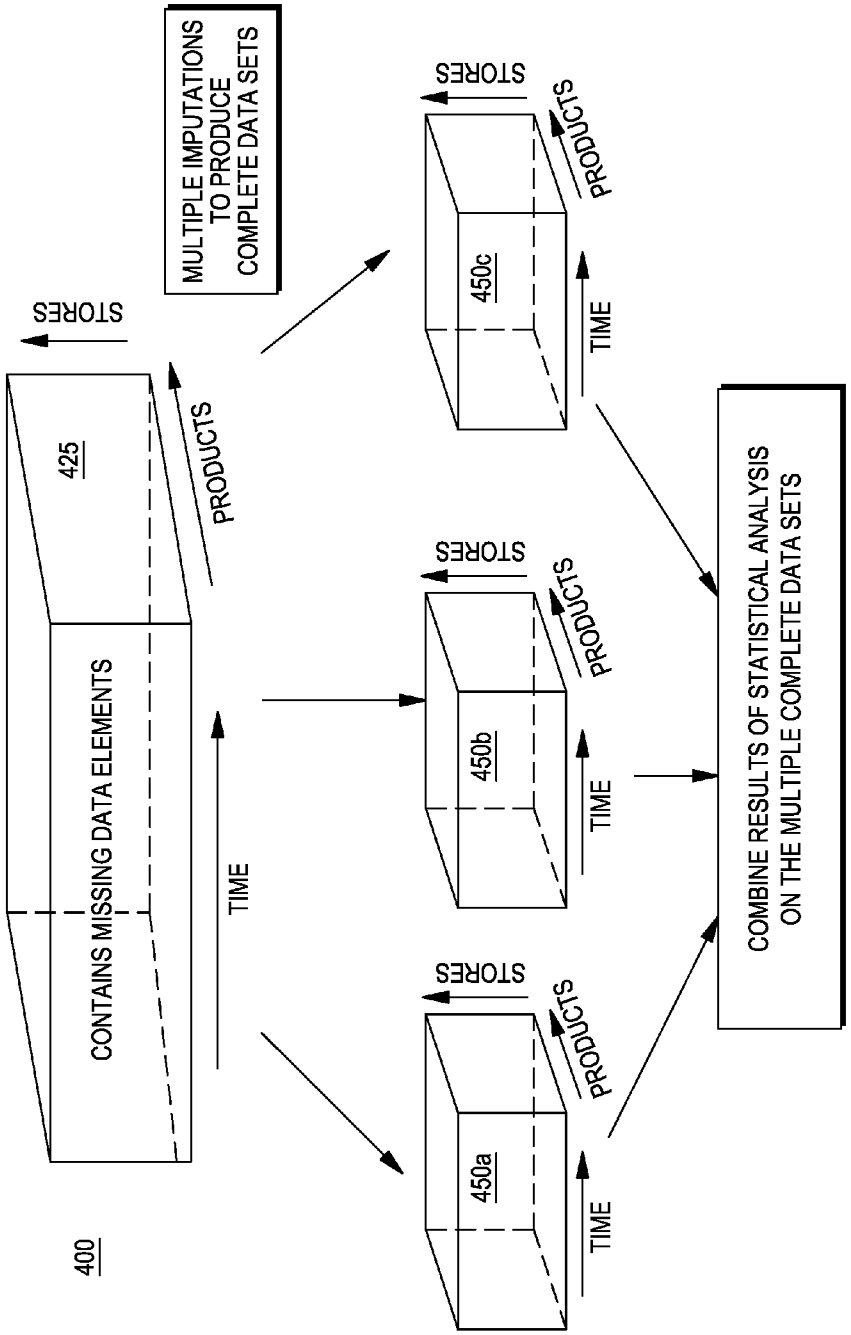
FIG. 6A illustrates conceptually method steps for obtaining multiple imputations corresponding to a plurality of complete data sets with the locations corresponding to the missing values in the original analysis data set replaced in each of the complete data sets by a sampled set of values from the joint distribution of the missing values obtained according to one embodiment.

FIG. 6A illustrates one embodiment of a method 400 for obtaining multiple imputations corresponding to a plurality of complete data sets 450*a*, 450*b*, . . . 450*n* with the locations corresponding to the missing values in the original analysis data set 425 replaced in each of the complete data sets by a sampled set of values from the joint distribution of the missing values as obtained using the method steps described herein.

Figure 6B:
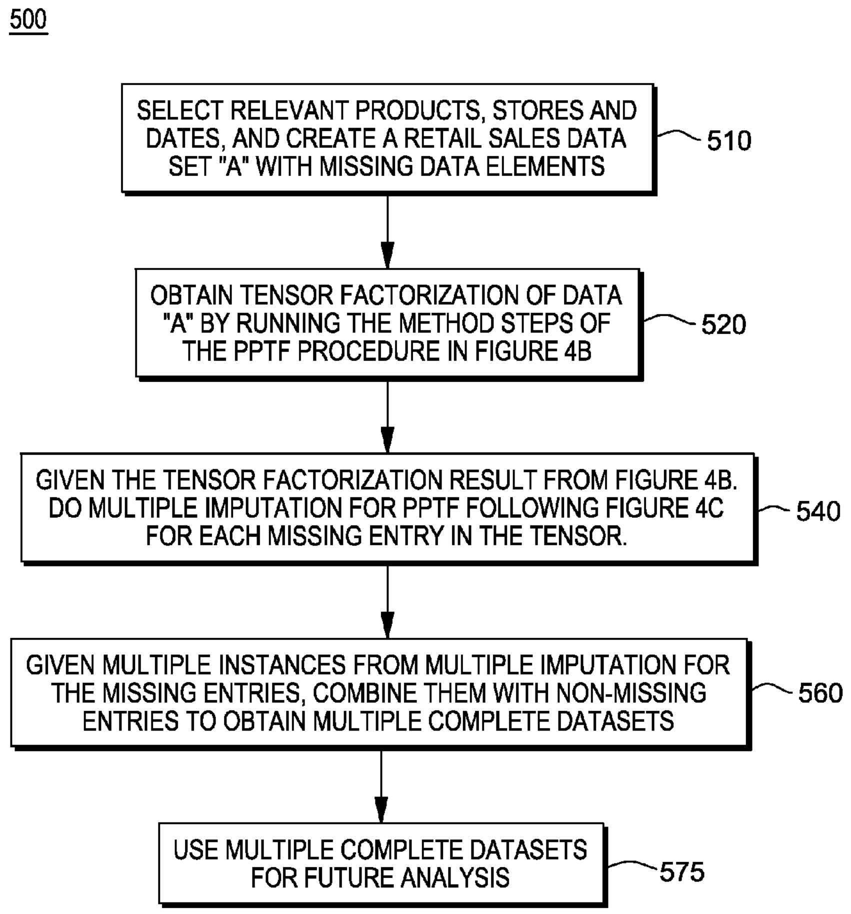
FIG. 6B shows a method 500 for multiple imputation using multi-dimensional correlations and tensor-product decompositions using the method steps of the PPTF algorithms described herein.

FIG. 6B shows a method 500 for multiple imputation using multi-dimensional correlations and tensor-product decompositions with specific embodiments using the method steps of the PPTF algorithms. Given the retail data set to be used for retail sales modeling, the relevant products, stores and dates are first selected to obtain a multi-dimensional data set "A" with missing data entries at 510, and vide FIG. 4B, the tensor factorization is obtained using in specific embodiments the method steps of the PPTF algorithm in FIG. 4B. Thus, for example, at 520 tensor factorization of data in set "A" is obtained by running the method steps of the PPTF procedure in FIG. 4B. Further, given the tensor factorization result from FIG. 4B, at 540, multiple imputation for PPTF is conducted according to method 150 of FIG. 4C for each missing entry in the tensor.

Figure 6C:
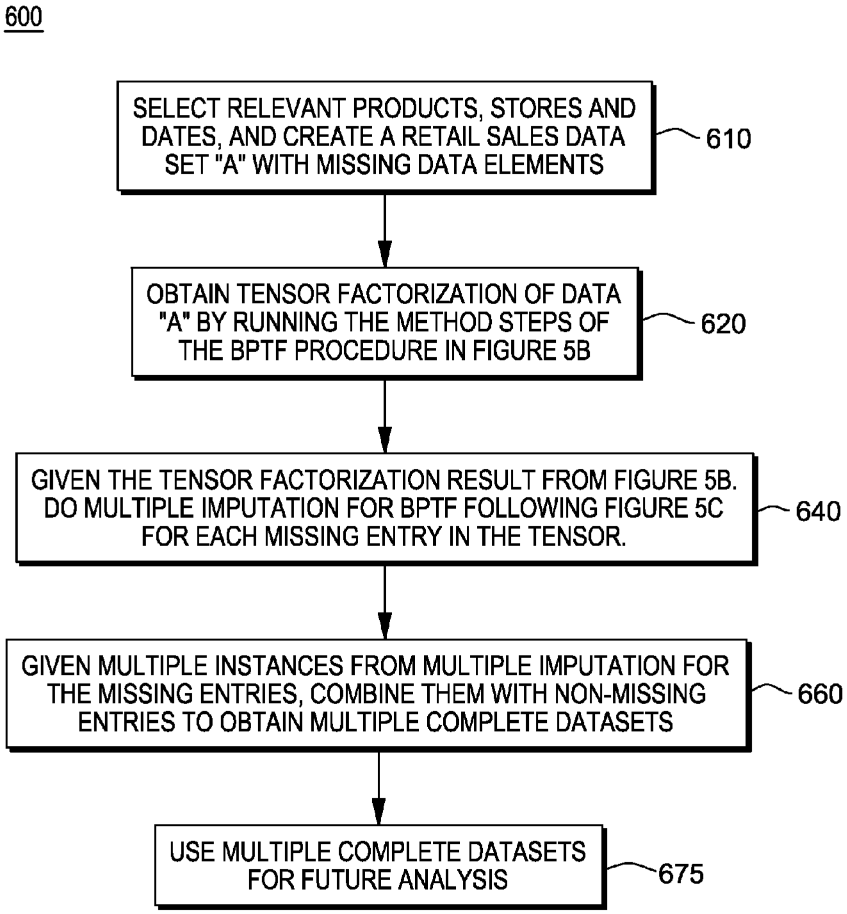
FIG. 6C shows a method 600 for multiple imputation using multi-dimensional correlations and tensor-product decompositions using the method steps of the BPTF algorithms described herein.

FIG. 6C shows a method 600 for multiple imputation using multi-dimensional correlations and tensor-product decompositions with specific embodiments using the method steps of the BPTF algorithms. Given the retail data set to be used for retail sales modeling, the relevant products, stores and dates are first selected to obtain a multi-dimensional data set "A" with missing data entries at 610, and vide FIG. 5B, the tensor factorization is obtained using in specific embodiments the method steps of the BPTF algorithm in FIG. 5B. Thus, for example, at 620 tensor factorization of data in set "A" is obtained by running the method steps of the BPTF procedure in FIG. 5B. Further, given the tensor factorization result from FIG. 5B, at 640, multiple imputation for BPTF is conducted according to method 350 of FIG. 5C for each missing entry in the tensor.

Thus, vide FIG. 4C or FIG. 5C, the multiple imputation values for the missing data entries is obtained, using as relevant in specific embodiments, i.e., the method steps of the PPTF algorithm in FIG. 4C or the method steps of the BPTF algorithm in FIG. 5C. As indicated at 560 in FIG. 6B and at 660 in FIG. 6C, the resulting collection of multiple imputation data sets are complete data sets with no missing entries, comprising of the non-missing data entries in the original retail sales data set being replicated, along with each data set containing one set of values from the multiple imputation results for the missing values in the original data set. The collection of multiple imputation data sets is then used for subsequent modeling and analysis as indicated at 575 (FIG. 6B) and at 675 (FIG. 6C). The techniques used for constructing individual models with the multiple imputation data sets, and for combining the individual model to obtain a resulting composite model, including the parameters, and standard error estimates of the parameters, for the resulting composite model, can be based—in one embodiment—on techniques described in the prior art, see, for example, J. L. Schafer, "Analysis of Incomplete Multivariate Data," Chapman and Hall, London (1997).

FIG. 7 refers to an illustration of a benefit of the proposed methodology in an example use which provides evidence of the accuracy of the missing value estimation for any given missing value in the data set, which is seen to be directly related to the confidence estimate for this value, as ascertained according to the techniques described herein from the resulting values in the multiple imputation data sets as now described in further detail.

More particularly, FIG. 7 illustrates the results of one exemplary application showing the relationship between the confidence and accuracy of imputed missing entries as obtained using the multiple imputation methodology, illustrating that, in general, the greater confidence in the model imputation also corresponds to higher accuracy in the imputed results.

As an example illustrating the particular embodiments, there is now described the application of the methodology in the context of a sales data set with missing data elements for a retail category corresponding to a household staple grocery with products having a retail shelf life of about a week.

In the example, a "real-world" sales data set is used comprising, for example, the unit-sales and unit-price data for the product category (e.g., provided as a computer file) which contains weekly-aggregated sales data on 333 products with unique UPC codes in the category, wherein UPC stands for Universal Product Category, which is a barcode-implemented product identifier that is commonly used for tracking products in retail stores, and this sales data is collected from 146 stores whose TDLinx codes were within the same metropolitan market geography, over a 3 year period from 2006 to 2009, wherein TDLinx is a location-based code, which developed by Nielsen (http://en-us.nielsen.com) to specify a unique retail channel, such as an individual store, retail outlet or retail sales account. Each record in this data set, therefore, contains separate fields with the UPC code, TDLinx code, week index, unit, sales and unit price information, for each (product, store, and week) or (p,s,t) combination for which the aggregated sales data is reported. As noted, the missing data elements for a particular (p,s,t) combination may arise due to a variety of causes including product introduction delays, product withdrawals, process errors in the data collection and logging etc., and many of these causes can be in fact identified by examining the pattern of missing values in the data set. In addition to the sales data set for the product category, some partial auxiliary data was also available on store promotions, inventory stock-outs and coupon redemptions, and this auxiliary data can be joined to the sales data, to support various extensions of the analysis that incorporate these auxiliary data elements according to further embodiments.

Furthermore, additional detailed information on the various individual attributes for the products in the sales data set can be obtained from a product master-data file, which contains information such as brand, packaging and product type. Finally, since the product category under study corresponds to an example "processed-food" category, additional data on the health-benefits, nutritional composition and product quality can also be ascertained from the product label information in public-domain databases. These auxiliary data elements can be incorporated into the method steps described according to the various embodiments herein, for instance, to identify sets of products that are similar to the products that are of particular interest; the retail sales data elements for these additional products can be included in the enhanced data set for carrying out the multiple imputation of the missing data elements, specifically enhancing the results of this multiple imputation for the products that are of particular interest.

Finally, detailed information on the store demographics and characteristics can also be obtained by combining data from public and private databases for the store dimension. These auxiliary data elements can be incorporated into the method steps described according to the various embodiments herein, for instance, to identify sets of stores that are similar to the stores that are of particular interest; the data elements in these additional stores can be included in the enhanced data set for carrying out the multiple imputation of the missing data elements, specifically for the stores that are of particular interest.

It can be noted that the use of any auxiliary data can even be solely for the purpose of missing data imputation, and once this imputation has been completed this auxiliary data need not be required or provided for the subsequent statistical modeling. Therefore, the use of tensor-based approaches incorporating auxiliary data may be used for missing data imputation, even in situations where it may be impossible to share the auxiliary data with the entities responsible for the subsequent statistical modeling. As an example, consider a retail chain with multiple stores, in which each store is interested in demand modeling based on its sales data, although many of these stores have data sets with missing data elements. The retail chain can, in this situation, collect the individual store data sets, and perform a multiple imputation for the missing values, using a tensor-based approach incorporating the data from all the stores. Finally, each store can be provided with its relevant subset from each multiple imputation data set, to obtain corresponding multiple imputation data sets for use in its demand modeling requirements as it see fit, without needing to ever have access to the data from the other stores. It can be readily surmised that having access to any auxiliary data, through the parent retail chain in this case, will considerably improve the quality of the multiple imputation data sets for each store, over what would be possible with the alternative of each store using only its own data for this purpose.

Given the sales data set described above, the method steps of the PPTF or BPTF algorithms as described previously for multiple imputation, can be directly implemented. The particular embodiment described herein uses various techniques for generating random sequences from the various probability distributions encountered in the descriptions therein; for instance, the Box-Muller transform as described in G. Box and M. Muller, "A Note on the Generation of Random Normal Deviates", The Annals of Mathematical Statistics, Vol. 29, No. 2, 1958, for random sampling from a Gaussian distribution; and the Bartlett-decomposition algorithm described in W. Smith and R. Hocking. "Algorithm AS 53: Wishart Variate Generator" Journal of the Royal Statistical Society. Series C (Applied Statistics) 21 (3): 341 C345. JSTOR 1972 for sampling from a Wishart distribution. The techniques for generating random sequences are used in steps (15)-(21) in the method steps shown and described in FIG. 5B.

Various results using the method steps of one embodiment for multiple imputation of data on a dataset which contains the unit-price and unit-sales tensor for a set of 19 products in 10 stores during a three-year period (August 2006 to August 2009). In summary, this tensor data set has the dimensions 19×10×156, and contains 28406 non-missing entries. In one embodiment, the method is used to either predict or impute the missing data values in this data set.

In general, the accuracy of the procedures for obtaining multiple imputation estimates of the missing values in a data set cannot be assessed in a straightforward way, since these imputed values cannot be compared with the true value, which by definition is missing and unknown. Therefore, in order to evaluate the accuracy, one approach is to set some of the non-missing values to be missing in some random fashion in the data set, and then carry out the multiple imputation procedures to obtain estimates for these pseudo "missing values", which may be compared with the corresponding known values. In one embodiment, therefore, for illustrative purposes, some fraction of the non-missing elements in the tensor data set are also randomly designated as missing, even though the corresponding original values are known, and these pseudo "missing values" are estimated by the multiple imputation procedures; the comparison of the imputed value or values with the original value for these pseudo "missing values" provides a means for quantitatively evaluating the accuracy of the imputed values. For notational purposes, and in conformance with standard usage in statistical modeling procedures, the set of pseudo "missing values" is termed the test set (whose values are known but presumed to be missing), and the set of remaining non-missing values is termed the training set.

The multiple imputation approach can be used to obtain the point estimate of each missing value, by simply averaging the corresponding imputed values in each of the multiple imputation data sets; furthermore, the estimated variance of this point estimate can also be obtained from these multiple imputed values, which can be used to obtain a confidence interval for the point estimate for the given missing value. A small estimated variance indicates that indicates that the model used for the multiple imputation procedure is quite effective in the imputation of the specific missing value. A large estimated variance, on the other hand, indicates that the model used for the multiple imputation procedure is not very effective in the imputation of the specific missing value. An important question that can be addressed using the multiple imputation, as to whether the predictions with high confidence are in fact more accurate than the predictions with low confidence, which can be ascertained by computing the associated confidence values for each pseudo "missing value" entry. Therefore, the pseudo "missing values" are sorted based on the standard deviation of the point estimate computed from the multiple imputation results as described above. The sorted values are then divided into five separate partitions, each partition containing 20% of the test set values: The first partition contains the first 20% of the entries with the lowest standard deviation (or high confidence) for the imputed values, and so on, with the last partition containing the last 20% of the entries which have the largest standard deviation for the imputed values. For each of these sets, the root-mean-square error (RMSE) is obtained, which is defined as $$RMSE = \sqrt{\frac{\sum_{i=1}^{n}(x_i - \hat{x}_i)^2}{n}},$$

where $x_i$ and $\hat{x}_i$ are the actual value and imputed values for the $i^{th}$ entry respectively, and n is the total number of entries in the set.

Figure 7A:
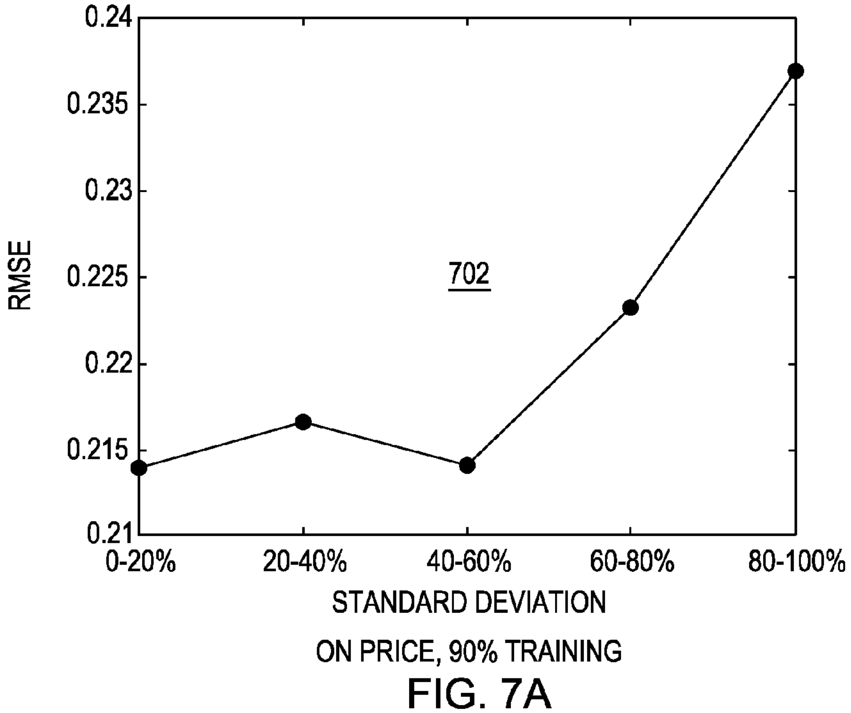
FIG. 7 illustrates the results of one exemplary application showing the relationship between the confidence and accuracy of imputed missing entries as obtained using the multiple imputation methodology.
Figure 7B:
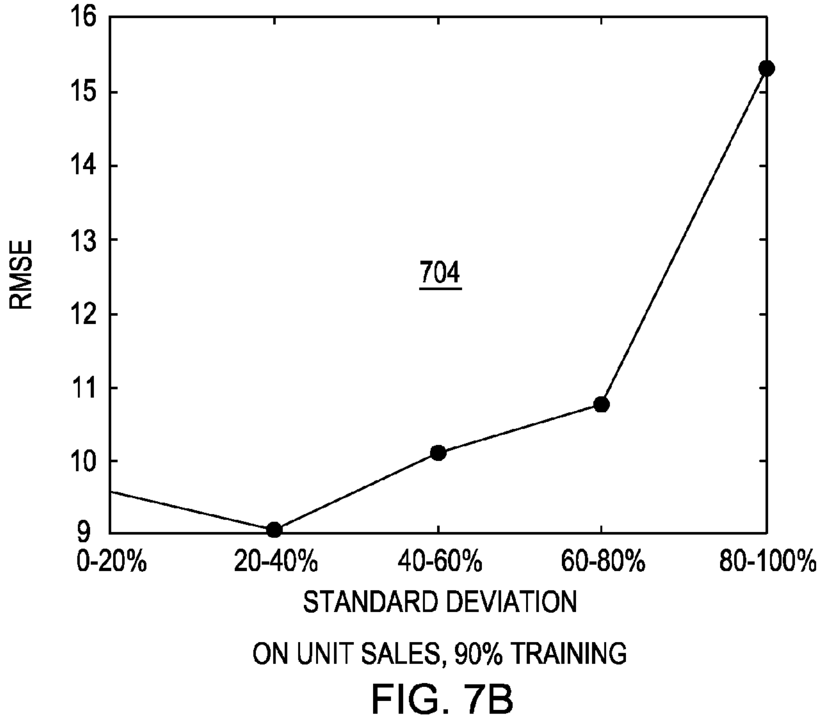
Figure 7C:
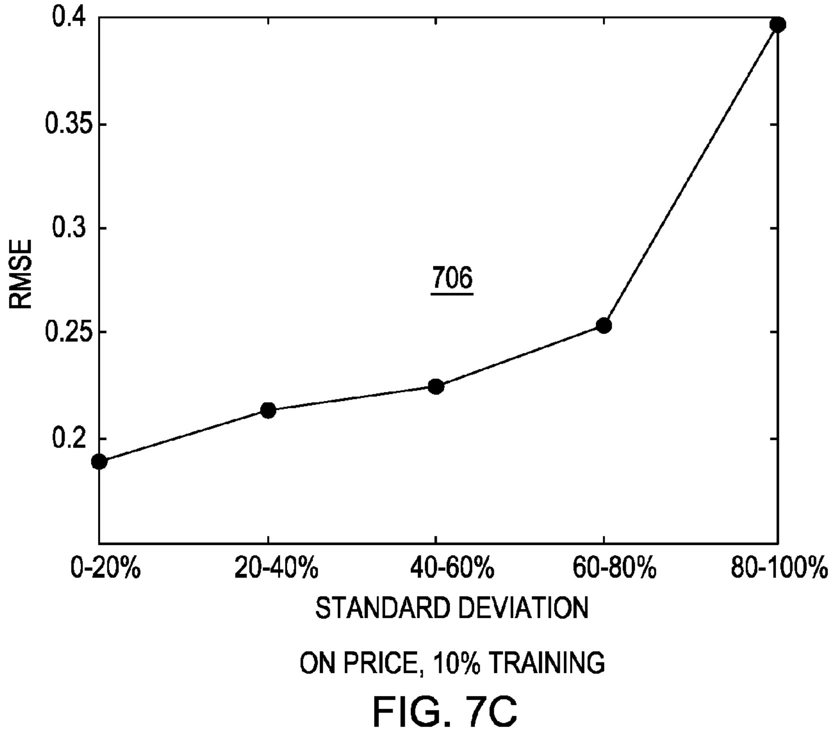
Figure 7D:
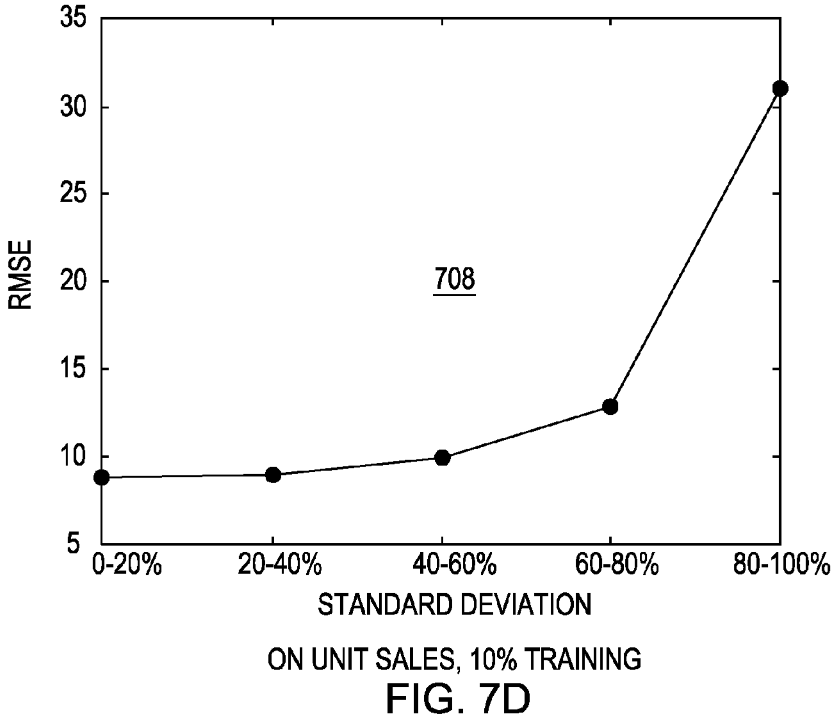

FIG. 7 shows the RMSE obtained for each of these partitions as described above, and provides strong evidence that the RMSE increases with decreasing confidence, where FIGS. 7A and 7B refer to the results 702, 704 obtained with 90% of data set used for training and 10% for testing, and FIGS. 7C and 7D refer to the results 706, 708 obtained when using 10% of data for training and 90% for testing. It is evident that, in this instance, that when the confidence decreases, the accuracy of the imputed values also decreases, in fact, almost monotonically.

Therefore, the results from the multiple imputation can be used to provide an indication of the accuracy of the imputed values in the resulting data sets, by obtaining the corresponding confidence values, or equivalently, by evaluating the variance of these values from the resulting multiple imputation data sets. This result provides one justification for obtaining multiple imputation data sets, since this also provides information on the associated accuracy of the missing values, which may not be available from just a single imputation data set containing the point estimates. This also justifies and confirms, in the same evident manner, the utility of having multiple imputation complete data sets for the subsequent statistical modeling to be performed, which as a result will provide models that reflect the true variability of the missing values that might be encountered in a hypothetical complete data set had these relevant missing values been putatively not missing.

In principle, it is clear that the confidence score described above (which, to reiterate, is equivalent to the corresponding standard deviation of the samples drawn from the posterior distribution in the BPTF procedure) can be provided even in the case when the sample values are averaged to obtain the point estimate. However, when provided in this form, these confidence scores cannot be directly used in any subsequent statistical modeling and analysis, whereas the multiple imputation data sets can always be used individually for any subsequent statistical modeling and analysis. Subsequently, the respective individual results from the statistical modeling and analysis on the multiple data sets can be finally averaged, so that in this way, the intrinsic variability of the estimates for the missing data values that is provided by the multiple imputation procedure can be suitably incorporated into the subsequent statistical modeling and analysis.

Via the system and method described herein, much greater accuracy and statistical reliability is obtained by simultaneously considering the multi-dimensional dependencies and correlations present in the retail data set.

Figure 8:
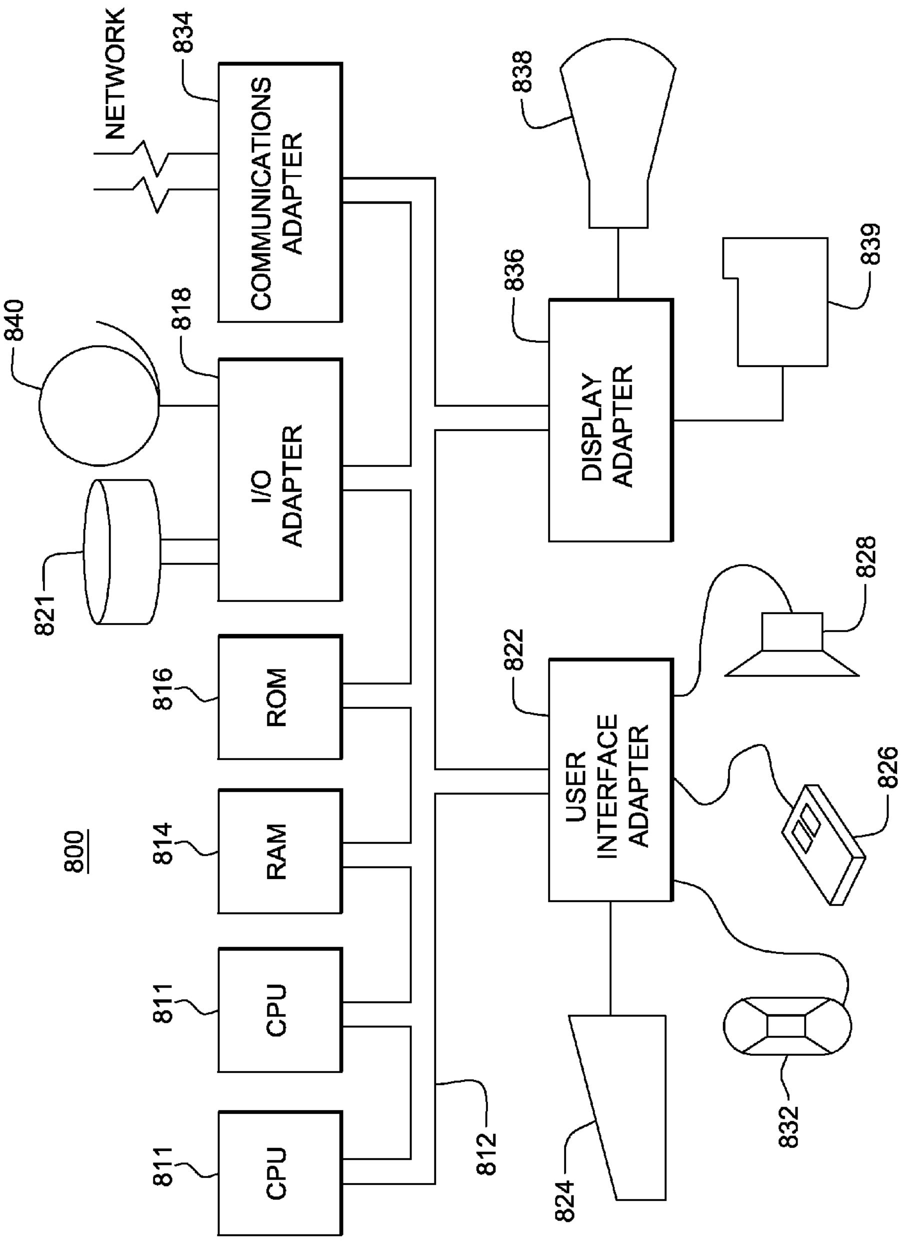
FIG. 8 illustrates an exemplary hardware configuration to run method steps described herein in one embodiment.

FIG. 8 illustrates an exemplary hardware configuration of the computing system 800. The hardware configuration preferably has at least one processor or central processing unit (CPU) 811. The CPUs 811 are interconnected via a system bus 912 to a random access memory (RAM) 914, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting the system 800 to a data processing network, the Internet, an Intranet, a local area network (LAN), etc., and a display adapter 836 for connecting the bus 812 to a display device 838 and/or printer 839 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM); a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the Figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

We claim:

1. A computer-implemented method for multiple imputation for retail data sets with missing data values, the method comprising:

- receiving an original data set including values including a plurality of products, a plurality of stores or chains in which each said product is sold, and a plurality of time-periods indicating when said products were sold;
- identifying and encoding the missing data values in the original data set with dummy indicator variables corresponding to specific product, store and time-period combinations;
- obtaining a joint probability distribution for the magnitudes of the missing data values in the original data set, the obtaining the joint probability distribution comprising:
  - specifying a probability model for the entries of the original data set based on a mean value obtained from a tensor-product factorization of dimensions comprising of product, store and time-period, and additionally, comprised of an additive noise term that has a zero mean and non-zero variance, and for obtaining a likelihood function for non-missing values of the original data set based on the probability model;

specifying probability models with parameters for latent factors in this tensor-product factorization;

specifying a posterior joint conditional distribution for said latent factors, the parameters in the probability models for these latent factors, and the said non-zero variance of the additive noise term, given the non-missing data values in the original data set; and specifying the joint distribution of the missing values in the original data set, based on marginalizing the likelihood function over the known non-missing values, given said posterior joint conditional distribution;

generating a plurality of complete data sets corresponding to the original data set, wherein each complete data set in said plurality of complete data sets corresponds to the original data set with its non-missing values intact, and replacing, in each of the complete data sets, missing values indicated by said dummy variables with a sampled set of values from the joint probability distribution for the magnitudes of the missing elements as obtained, wherein a programmed processor device performs one or more of one or more the receiving, identifying and encoding, obtaining, generating and replacing.

2. The computer-implemented method as claimed in claim 1, wherein said identifying and encoding missing data values in the original data set further comprises:

adding a missing data indicator to the original data for each combination of product, store and time-period, the missing data indicator having a value set to indicate one of: that the corresponding sales data has been recorded, or that the missing sales data record is excluded from the original data set, or that the missing data record is included but recorded with a a pre-determined data code, or is included but recorded with an erroneous value.

3. The computer-implemented method according to claim 1, wherein said specifying the posterior joint conditional distribution for the latent factors, the parameters in the probability model for the latent factors, and the non-zero variance in the additive noise term, given the non-missing values in the original data set further comprises: applying Bayes rule to obtain the posterior joint conditional distribution in terms of the likelihood function for the non-missing values in the original data set, and in terms of prior distributions for the latent factors in the tensor-product factorization.

4. The computer-implemented method according to claim 3, wherein said specifying the probability model for the entries of the original data set further comprises one of:

specifying said probability model in terms of said mean value; and estimating said mean value in terms of latent factors according to a low-rank tensor factorization of said dimensions; or specifying the probability model for the additive noise in terms of a said variance; and, estimating said variance as a constant value.

5. The computer-implemented method according to claim 3, wherein said applying Bayes rule to obtain the posterior joint conditional distribution in terms of the likelihood function for the non-missing values in the original data set, and in terms of the distribution functions for the said probability models for the latent factors in tensor-product factorization, further comprises:

specifying a prior distribution for said latent factors in the tensor-product factorization in terms of a Normal distribution with a specified mean and covariance parameters, and said mean and covariance parameters in turn specified in terms of Normal-Wishart distribution with one or more hyper-parameters; and, specifying the prior distribution for the additive noise variance in terms of a Gamma distribution with said one or more hyper-parameters.

6. The computer-implemented method according to claim 3, wherein the specifying a posterior conditional distribution for the joint distribution for latent factors in the tensor-product factorization, and the parameters in the probability models for these latent factors specified further comprises:

obtaining the joint posterior distribution for the latent factors in the tensor-product factorization, and the mean and covariance parameters in the probability models for these latent factors, from a Bayesian formulation, in terms of the likelihood for the non-missing values in the data set, and in terms of the prior distributions for the latent factors in the tensor-product factorization, and for the mean and covariance parameters in the probability model for the latent factors, respectively;

obtaining the joint distribution of the missing values of the original data set by marginalizing the likelihood for the values in the data set over the non-missing values, given the said joint posterior distribution; and obtaining sample realizations of the said joint distribution of the missing values in the original data set, with each sample realization providing a complete data set, and the collection of these complete data sets comprising the multiple imputation data sets.

7. The computer-implemented method according to claim 6, wherein the obtaining the said joint posterior distribution for the latent factors in the tensor-product factorization, and the mean and covariance parameters in the probability models for these latent factors, from a Bayesian formulation, in terms of the likelihood for the non-missing values in the data set, further comprises of:

obtaining the posterior distribution of the latent factors in terms of a variational approximation to the posterior distribution.

8. The computer-implemented method according to claim 7, wherein the obtaining the joint posterior distribution of the latent factors in the tensor-product factorization, and the mean and covariance parameters in the probability model for these latent factors, from a Bayesian formulation in terms of the likelihood for the non-missing values in the data set, and in terms of the prior distributions for the latent factor in the tensor-product factorization, and the mean and covariance parameters in the probability model for these latent factors, further comprises:

performing, in a processor device, a Markov-chain Monte-Carlo (MCMC) simulation to obtain simulation results used for obtaining the posterior distribution of the latent factors and parameters in the probability model for the latent factors.

9. The computer-implemented method according to claim 6, wherein the obtaining sample realizations of the joint distribution of the missing values in the original data set further comprises:

obtaining a plurality of complete data sets, with each individual complete data set in this sample containing a distinct sample realization from the joint distribution of the missing values in the original data set.

10. A system for multiple imputation of data values for retail data sets with missing data elements comprising:

at least one processor device; and at least one memory device connected to the processor, wherein the processor is programmed to perform a method, the method comprising:

receiving an original data set including values including a plurality of products, a plurality of stores or chains in which each said product is sold, and a plurality of time-periods indicating when said products were sold;

identifying and encoding the missing data elements in the original data set with dummy indicator variables corresponding to specific product, store and time-period combinations;

obtaining a joint probability distribution for the magnitudes of the missing data elements in the original data set, the obtaining the joint probability distribution comprising:

specifying a probability model for the entries of the original data set based on a mean value obtained from a tensor-product factorization of dimensions comprising of product, store and time-period, and additionally, comprised of an additive noise term that has a zero mean and non-zero variance, and for obtaining a likelihood function for non-missing values of the original data set based on this probability model;

specifying probability models with parameters for latent factors in this tensor-product factorization;

specifying a posterior joint conditional distribution for said latent factors, the parameters in the probability models for these latent factors, and the said non-zero variance of the additive noise term, given the non-missing data values in the original data set; and specifying the joint distribution of the missing values in the original data set, based on marginalizing the likelihood function over the known non-missing values, given said posterior joint conditional distribution;

generating a plurality of complete data sets corresponding to the original data set, wherein each complete data set in said plurality of complete data sets corresponds to the original data set with its non-missing values intact, and replacing, in each of the complete data sets, missing values indicated by said dummy vaiables with a sampled set of values from the joint probability distribution for the magnitudes of the missing elements as obtained.

11. The system as claimed in claim 10, wherein said identification and encoding further comprises:

adding a missing data indicator to the original data for each combination of product, store and time-period, the missing data indicator having a value set to indicate one of: that the corresponding sales data has been recorded, or that the missing sales data record is excluded from the original data set, or that the missing data record is included but recorded with a pre-determined data code, or is included but recorded with an erroneous value.

12. The system according to claim 10, wherein said specifying the posterior joint conditional distribution for the latent factors, the parameters in the probability model for the latent factors, and the non-zero variance in the additive noise term, given the non-missing values in the original data set further comprises: applying Bayes rule to obtain the posterior joint conditional distribution in terms of the likelihood function for the non-missing values in the original data set, and in terms of prior distributions for the latent factors in the tensor-product factorization.

13. The system according to claim 12, wherein the specifying the probability model for the entries of the original data set further comprises one of:

specifying said probability model in terms of said mean value; and estimating said mean value according to a low-rank tensor factorization of said dimensions; or specifying the probability model in terms of a variance; and, estimating said variance as a constant value.

14. The system according to claim 12, wherein said applying Bayes rule to obtain the posterior joint conditional distribution in terms of the likelihood function for the non-missing values in the original data set, and in terms of the parameterized distribution functions for the latent factors in tensor-product factorization, further comprises:

specifying a prior distribution for said latent factors in the tensor-product factorization in terms of a Normal distribution with parameters comprising of a mean and covariance matrix, and said mean and covariance matrix specified in terms of Normal-Wishart distribution with one or more hyper-parameters; and, specifying the prior distribution for the additive noise variance in terms of a Gamma distribution with said one or more hyper-parameters.

15. The system according to claim 12, wherein the specifying a posterior conditional distribution for the joint distribution for latent factors in the tensor-product factorization, and the parameters in the probability models for the latent factors specified further comprises:

obtaining the joint posterior distribution for the latent factors in the tensor-product factorization, and the mean and covariance parameters in the probability models for these latent factors, from a Bayesian formulation, in terms of the likelihood for the non-missing values in the data set, and in terms of the prior distributions for the latent factors in the tensor-product factorization, and for the mean and covariance parameters in the probability model for the latent factors, respectively;

obtaining the joint distribution of the missing values of the original data set by marginalizing the likelihood for the values in the data set over the non-missing values, given the said joint posterior distribution; and obtaining sample realizations of the said joint distribution of the missing values in the original data set, with each sample realization providing a complete data set, and the collection of these complete data sets comprising the multiple imputation data sets.

16. The system according to claim 15, wherein the obtaining the said joint posterior distribution for the latent factors in the tensor-product factorization, and the mean and covariance parameters in the probability models for these latent factors, from a Bayesian formulation, in terms of the likelihood for the non-missing values in the data set, further comprises:

obtaining the posterior distribution of the latent factors in terms of a variational approximation to the posterior distribution.

17. The system according to claim 15, wherein the obtaining the joint posterior distribution of the latent factors in the tensor-product factorization, and the mean and covariance parameters in the probability model for these latent factors, from a Bayesian formulation in terms of the likelihood for the non-missing values in the data set, and in terms of the prior distributions for the latent factor in the tensor-product factorization, and the mean and covariance parameters in the probability model for these latent factors, further comprises:

performing, in a processor device, a Markov-chain Monte-Carlo (MCMC) simulation to obtain simulation results used for obtaining the posterior distribution of the latent factors and parameters in the probability model for the latent factors.

18. The system according to claim 15, wherein the obtaining sample realizations of the joint distribution of the missing values in the original data set further comprises:

obtaining a plurality of complete data sets, with each individual complete data set in this sample containing a distinct sample realization from the joint distribution of the missing values in the original data set.

19. A computer program product for imputing multiple data values for retail data sets with missing data elements, the computer program product comprising a tangible storage medium, said tangible storage medium not a propagating signal, readable by a processing circuit and storing instructions run by the processing circuit for performing a method, the method comprising:

receiving an original data set including values including a plurality of products, a plurality of stores or chains in which each said product is sold, and a plurality of time-periods indicating when said products were sold;

identifying and encoding the missing data values in the original data set with dummy indicator variables corresponding to specific product, store and time-period combinations;

obtaining a joint probability distribution for the magnitudes of the missing data values in the original data set, the obtaining the joint probability distribution comprising:

specifying a probability model for the entries of the original data set based on a mean value obtained from a tensor-product factorization of dimensions comprising of product, store and time-period, and additionally, comprised of an additive noise term that has a zero mean and non-zero variance, and for obtaining a likelihood function for non-missing values of the original data set based on this probability model;

specifying probability models with parameters for latent factors in this tensor-product factorization;

specifying a posterior joint conditional distribution for said latent factors, the parameters in the probability models for these latent factors, and the said non-zero variance of the additive noise term, given the non-missing data values in the original data set; and specifying the joint distribution of the missing values in the original data set, based on marginalizing the likelihood function over the known non-missing values, given said posterior joint conditional distribution;

generating a plurality of complete data sets corresponding to the original data set, wherein each complete data set in said plurality of complete data sets corresponds to the original data set with its non-missing values intact, and replacing, in each of the complete data sets, missing values indicated by said dummy variables with a sampled set of values from the joint probability distribution for the magnitudes of the missing elements as obtained.

20. The computer program product according to claim 19, wherein said specifying the posterior joint conditional distribution for the latent factors, the parameters in the probability model for the latent factors, and the non-zero variance in the additive noise term, given the non-missing values in the original data set further comprises: applying Bayes rule to obtain the posterior joint conditional distribution in terms of the likelihood function for the non-missing values in the original data set, and in terms of parameterized distribution functions for the latent factors in the tensor-product factorization.

21. The computer program product according to claim 20, wherein said applying Bayes rule to obtain the posterior joint conditional distribution in terms of the likelihood function for the non-missing values in the original data set, and in terms of the distribution functions for the said probability models for the latent factors in tensor-product factorization, further comprises:

specifying a prior distribution for said latent factors in the tensor-product factorization in terms of a Normal distribution with a specified mean and covariance parameters, and said mean and covariance parameters in turn specified in terms of Normal-Wishart distribution with one or more hyper-parameters; and, specifying the prior distribution for the additive noise variance in terms of a Gamma distribution with said one or more hyper-parameters.

22. The computer program product according to claim 20, wherein the specifying a posterior conditional distribution for the joint distribution for latent factors in the tensor-product factorization, and the parameters in the probability models for these latent factors specified further comprises:

obtaining the joint posterior distribution for the latent factors in the tensor-product factorization, and the mean and covariance parameters in the probability models for these latent factors, from a Bayesian formulation, in terms of the likelihood for the non-missing values in the data set, and in terms of the prior distributions for the latent factors in the tensor-product factorization, and for the mean and covariance parameters in the probability model for the latent factors, respectively;

obtaining the joint distribution of the missing values of the original data set by marginalizing the likelihood for the values in the data set over the non-missing values, given the said joint posterior distribution; and obtaining sample realizations of the said joint distribution of the missing values in the original data set, with each sample realization providing a complete data set, and the collection of these complete data sets comprising the multiple imputation data sets.

* * * * *